US011743759B2

(12) United States Patent
Kim

(10) Patent No.: US 11,743,759 B2
(45) Date of Patent: Aug. 29, 2023

(54) METHOD FOR EFFECTIVELY TRANSMITTING DOWNLINK DATA BY SERVER FOR CONTROLLING TCU MOUNTED IN VEHICLE

(71) Applicant: LG ELECTRONICS INC., Seoul (KR)

(72) Inventor: Cheolseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 17/596,772

(22) PCT Filed: Aug. 14, 2019

(86) PCT No.: PCT/KR2019/010353
§ 371 (c)(1),
(2) Date: Dec. 17, 2021

(87) PCT Pub. No.: WO2021/029465
PCT Pub. Date: Feb. 18, 2021

(65) Prior Publication Data
US 2022/0322132 A1 Oct. 6, 2022

(51) Int. Cl.
*H04W 28/02* (2009.01)
*H04W 16/28* (2009.01)
*H04W 28/14* (2009.01)

(52) U.S. Cl.
CPC ....... *H04W 28/0268* (2013.01); *H04W 16/28* (2013.01); *H04W 28/14* (2013.01)

(58) Field of Classification Search
CPC .. H04W 28/0268; H04W 16/28; H04W 28/14
See application file for complete search history.

(56) References Cited

U.S. PATENT DOCUMENTS

2013/0268581 A1* 10/2013 Kim ............... H04L 67/02
709/203
2016/0173157 A1* 6/2016 Park ............... H04W 68/02
370/329

(Continued)

FOREIGN PATENT DOCUMENTS

JP 2017175393 9/2017
KR 1020130113283 10/2013

(Continued)

OTHER PUBLICATIONS

PCT International Application No. PCT/KR2019/010353, International Search Report dated May 14, 2020, 4 pages.

*Primary Examiner* — Ajay Cattungal
(74) *Attorney, Agent, or Firm* — Lee, Hong, Degerman, Kang & Waimey PC

(57) ABSTRACT

One disclosure of the present specification provides a telematics communication unit (TCU) mounted in a vehicle. The TCU may comprise: a memory; a plurality of transmission/reception units including one or more antennas; and a processor for controlling the plurality of transmission/reception units. The processor may perform the steps of: collecting service requirements for one or more electronic devices in the vehicle, and then transmitting the collected service requirements to a server via a base station; receiving downlink data from the server through the base station; determining whether a data transmission rate according to the service requirements for one or more electronic devices in the vehicle can be supported at a transmission rate through available frequency channels of an antenna beam; and transferring the downlink data received from the server to the one or more electronic devices in the vehicle through the antenna beam according to the determination.

15 Claims, 25 Drawing Sheets

(56) References Cited

U.S. PATENT DOCUMENTS

| | | | | |
|---|---|---|---|---|
| 2018/0063882 A1* | 3/2018 | MacDonald | ............ | H04W 4/70 |
| 2018/0247067 A1* | 8/2018 | Hrabak | ............... | G06F 21/6218 |
| 2019/0154439 A1* | 5/2019 | Binder | ................... | G01B 11/26 |
| 2019/0320494 A1* | 10/2019 | Jayawardene | ........ | H04L 5/0041 |
| 2019/0364492 A1* | 11/2019 | Azizi | .................... | H04W 48/16 |
| 2019/0385057 A1* | 12/2019 | Litichever | ............... | H04L 63/14 |
| 2019/0394654 A1* | 12/2019 | Gardner | ............... | H04W 40/22 |
| 2019/0394676 A1* | 12/2019 | Gardner | ............. | H04W 28/021 |
| 2020/0294401 A1* | 9/2020 | Kerecsen | ............. | G05D 1/0287 |
| 2020/0314752 A1* | 10/2020 | Haque | ............... | H04W 52/0216 |
| 2020/0389469 A1* | 12/2020 | Litichever | ............... | H04W 4/40 |

FOREIGN PATENT DOCUMENTS

| | | |
|---|---|---|
| KR | 1020160072991 | 6/2016 |
| KR | 1020170114051 | 10/2017 |
| WO | 2018125686 | 7/2018 |

* cited by examiner

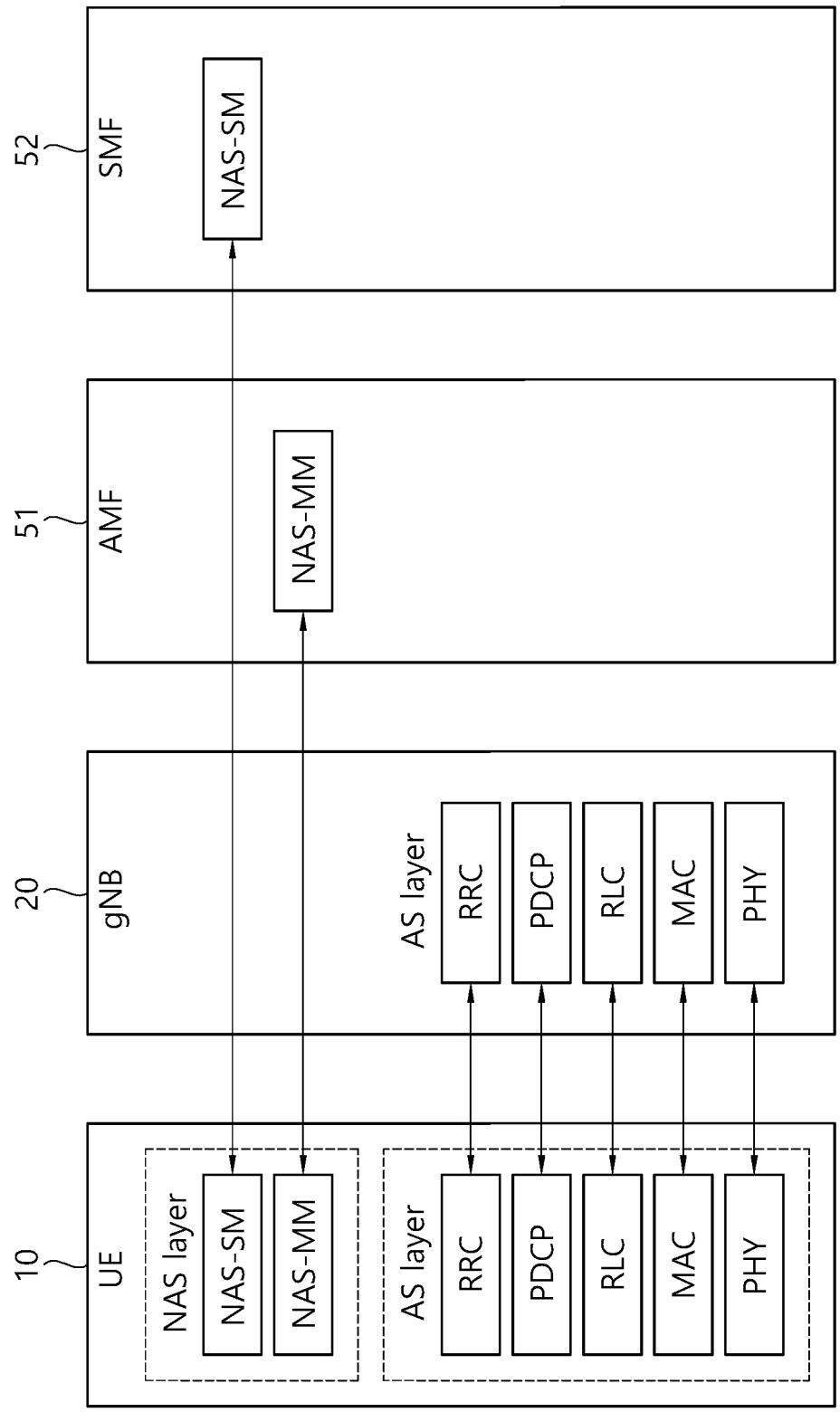

METHOD FOR EFFECTIVELY TRANSMITTING DOWNLINK DATA BY SERVER FOR CONTROLLING TCU MOUNTED IN VEHICLE

CROSS-REFERENCE TO RELATED APPLICATIONS

This application is the National Stage filing under 35 U.S.C. 371 of International Application No. PCT/KR2019/010353, filed on Aug. 14, 2019, the contents of which are all incorporated by reference herein in their entirety.

TECHNICAL FIELD

The present disclosure relates to communication with a telematics communication unit installed in a vehicle in next-generation mobile communication.

BACKGROUND

With the success of Long-Term Evolution (LTE)/LTE-Advanced (LTE-A) for 4th-generation mobile communication, there is a growing interest in next-generation mobile communication, i.e., 5th-generation mobile communication (known as 5G), and extensive research on the 5th-generation mobile communication are being conducted.

5G mobile communication defined by the International Telecommunication Union (ITU) provides a data transfer rate of up to 20 Gbps and a sensory transfer rate of at least 100 Mbps anytime anywhere. 5G mobile communication is formally named 'IMT-2020' and aims to be commercialized worldwide by 2020.

The ITU presents three usage scenarios, e.g., enhanced Mobile Broadband (eMBB), massive Machine-Type Communication (mMTC), and Ultra-Reliable Low-Latency Communication (URLLC).

First, URLLC relates to a usage scenario in which a high reliability and a low latency are required. For example, a service, such as autonomous driving, factory automation, and augmented reality, requires a high reliability and a low latency (e.g., a latency of 1 ms or less). Currently, a latency in 4G (LTE) is statistically 21 to 43 ms (best 10%) and 33 to 75 ms (median). This latency is inadequate to support a service requiring a latency of 1 ms or less.

Next, eMBB relates to a usage scenario in which a mobile ultra-wide band is required.

It is considered that a core network designed for existing LTE/LTE-A has difficulty in accommodating a high-speed service in the ultra-wide band.

Therefore, it is urgently required to redesign a core network for 5G mobile communication.

FIG. 1 illustrates a structure of a next-generation mobile communication network.

A 5G Core (5GC) may include various components, among which an Access and mobility Management Function (AMF) 51, a Session Management Function (SMF) 52, and a Policy Control Function (PCF) 53, a User Plane Function (UPF) 54, an Application Function (AF) 55, a Unified Data Management (UDM) 56, and a Non-3GPP Interworking Function (N3IWF) 59 are illustrated as some components in FIG. 1.

A UE 10 is connected to a data network 60 via the UPF 55 through a Next-Generation Radio Access Network (NG-RAN).

The UE 10 may also be provided with a data service through untrusted non-3GPP access, e.g., a Wireless Local Area Network (WLAN). To connect the non-3GPP access to a core network, the N3IWF 59 may be deployed.

<Automotive Driving>

Autonomous driving is expected to be an important new driving force for 5G with various applications of mobile communications to vehicles.

In autonomous driving in which a server remotely controls a vehicle, to achieve Ultra-Reliable Low-Latency Communication (URLLC) stipulated in 5G, within 5 msec or less, the vehicle needs to transmit data to the server, receive control data from the server, and operate.

However, in a conventional cloud server-based network structure (e.g., base station-wired network-cloud server), it takes about 30 to 40 msec for the base station to transmit data received from a vehicle to the cloud server, for the cloud server to analyze the data and transmit the data to the base station, and for the base station to receive the data.

To improve the conventional network structure and to achieve URLLC, the European Telecommunications Standards Institute (ETSI) and 5GAA are discussing Multi-access Edge Computing (MEC). However, there is no conventional method for quickly and efficiently performing data transmission and reception between an MEC server and a Telematics Communication Unit (TCU) provided in a vehicle.

SUMMARY

Therefore, an aspect of embodiments of the present disclosure is to solve the foregoing problems.

To achieve the foregoing aspect, an embodiment of the present specification provides a Telematics Communication Unit (TCU) mounted in a vehicle. The TCU may comprise a memory; a plurality of transceivers including one or more antennas; and a processor for controlling the plurality of transceivers. The processor may be configured to perform operations comprising: after collecting service requirements for one or more electronic devices in the vehicle, transmitting the service requirements to a server through a base station, receiving downlink data from the server through the base station, determining whether a data transmission rate according to the service requirements for the one or more electronic devices in the vehicle can be supported as a transmission rate through available frequency channels of an antenna beam, and transmitting the downlink data received from the server through a corresponding antenna beam to the one or more electronic devices in the vehicle according to the determination.

Collecting the service requirements for the one or more electronic devices in the vehicle may comprise: obtaining information on service requirements for each electronic device, and collecting the information on the service requirements. The information on the service requirements may include information on a minimum data transmission rate and delay requirements.

The processor may be further configured to perform operations comprising: selecting a transceiver and an antenna beam having a maximum transmission rate from among the plurality of transceivers.

The processor may be further configured to perform operations comprising: buffering the downlink data received from the server in a reception buffer in the memory.

The processor may be further configured to perform operations comprising: copying the downlink data buffered in the buffer to internal registers by a size of each of the internal registers of each of the plurality of transceivers.

The plurality of transceivers may comprise a Long-Term Evolution (LTE) transceiver, a 5G transceiver, and a Wireless Local Area Network (WLAN) transceiver.

The 5G transceiver may comprise a first 5G transceiver using a sub-6 GHz band and a second 5G transceiver using mmWave.

The one or more electronic devices in the vehicle may comprise at least one of an Engine Control Unit (ECU), a Domain Control Unit (DCU), a Local Interconnect Network (LIN) master, a Media Oriented System Transport (MOST) master, an Ethernet switch, a radar sensor, a LiDAR sensor, a camera, an Audio Video Navigation (AVN), and a Rear Seat Entertainment (RSE).

To achieve the foregoing aspect, an embodiment of the present specification provides a server for controlling a Telematics Communication Unit (TCU) mounted in a vehicle in a next-generation mobile communication system. The server may comprise a transceiver; and a processor for controlling the transceiver. The processor may be configured to perform operations comprising: receiving, through a base station, information on service requirements for one or more electronic devices connected to the TCU mounted in the vehicle, comparing a data transmission rate by an antenna beam of the base station and a data transmission rate according to the service requirements, and transmitting downlink data through the antenna beam of the base station.

The processor may be further configured to perform operations comprising: determining a radio channel to be used between the TCU mounted in the vehicle and the one or more electronic devices, and transmitting information on the determined radio channel to the TCU through the base station.

Determining the radio channel may comprise: calculating a distance to other TCUs, comparing the distance to the other TCUs with a threshold distance, and according to the comparison, determining a radio channel having a signal strength greater than a Signal-to-Interference and Noise Ratio (SINR) causing a transmission failure.

Determining the radio channel may comprise: selecting a plurality of radio channels.

The processor may be further configured to perform operations comprising: determining an antenna beam between the TCU mounted in the vehicle and the one or more electronic devices, and transmitting information on the determined antenna beam to the TCU through the base station.

The base station may comprise a Long-Term Evolution (LTE) transceiver, a 5G transceiver, and a Wireless Local Area Network (WLAN) transceiver.

The 5G transceiver may comprise a first 5G transceiver using a sub-6 GHz band and a second 5G transceiver using mmWave.

According to the disclosure of the present specification, the existing problems can be solved.

Specifically, according to the disclosure of the present specification, much more data can be transmitted than when the base station transmits with one type of antenna/modem.

According to the disclosure of the present specification, since the MEC server allocates a channel for direct communication between the TCU and the in-vehicle electronic device to the TCU, frequency interference from the TCU of an adjacent vehicle can be minimized.

According to the disclosure of the present specification, the TCU can transmit data to the in-vehicle electronic device at a much higher speed than before.

According to the disclosure of the present specification, the TCU can transmit the same data through a plurality of different radio links to increase the transmission rate, or transmit different data through each radio link to simultaneously support various services.

According to the disclosure of the present specification, after the safety message is immediately processed, the ECU control operation result can be notified to the MEC server and the cloud server to enhance safety.

BRIEF DESCRIPTION OF THE DRAWINGS

FIG. 4 illustrates the structure of a radio interface protocol between a UE and a gNB.

DETAILED DESCRIPTION

Figure 1:
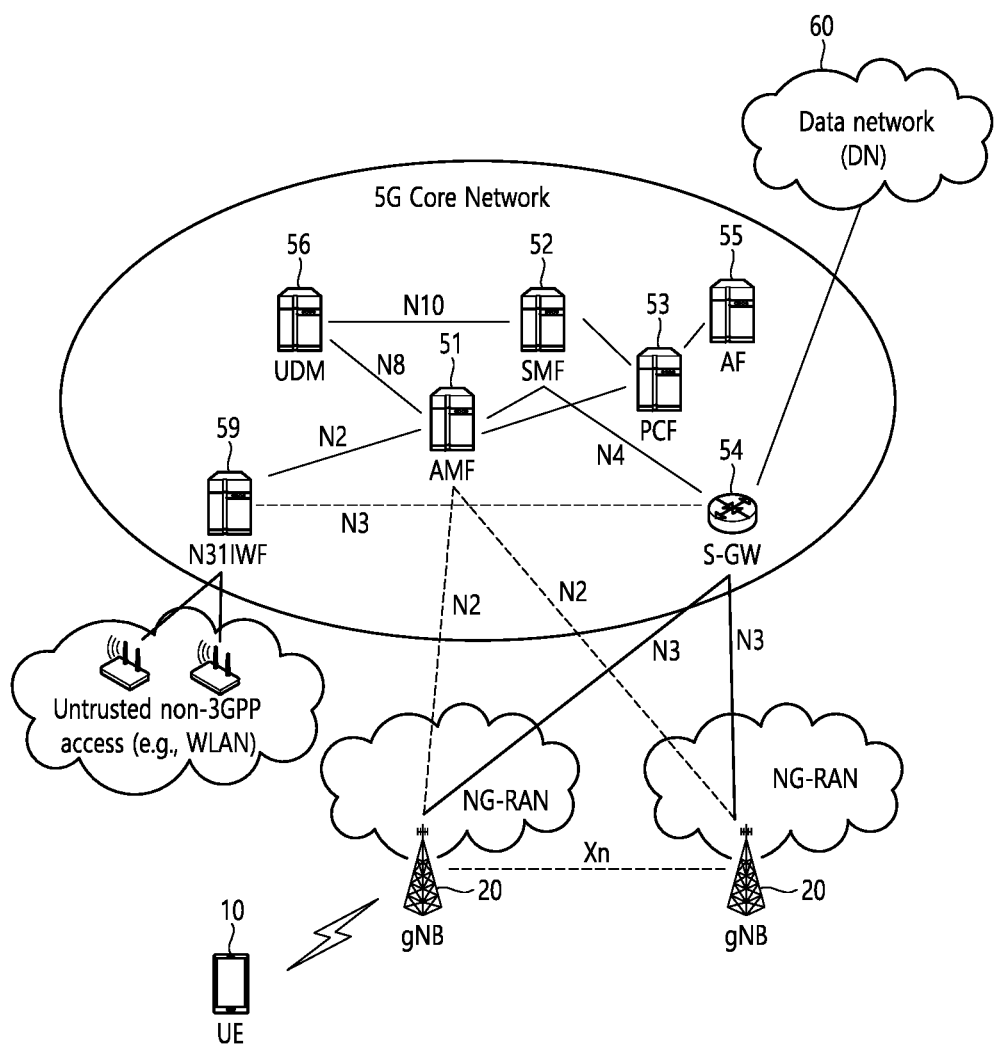
FIG. 1 illustrates a structure of a next-generation mobile communication network.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term "include" or "have" may represent the existence of a feature, a number, a step, an operation, a component, a part or the combination thereof described in the specification, and may not exclude the existence or addition of another feature, another number, another step, another operation, another component, another part or the combination thereof.

The terms "first" and "second" are used for the purpose of explanation about various components, and the components are not limited to the terms "first" and "second". The terms "first" and "second" are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

<Structure of Next-Generation Mobile Communication System>

Figure 2:
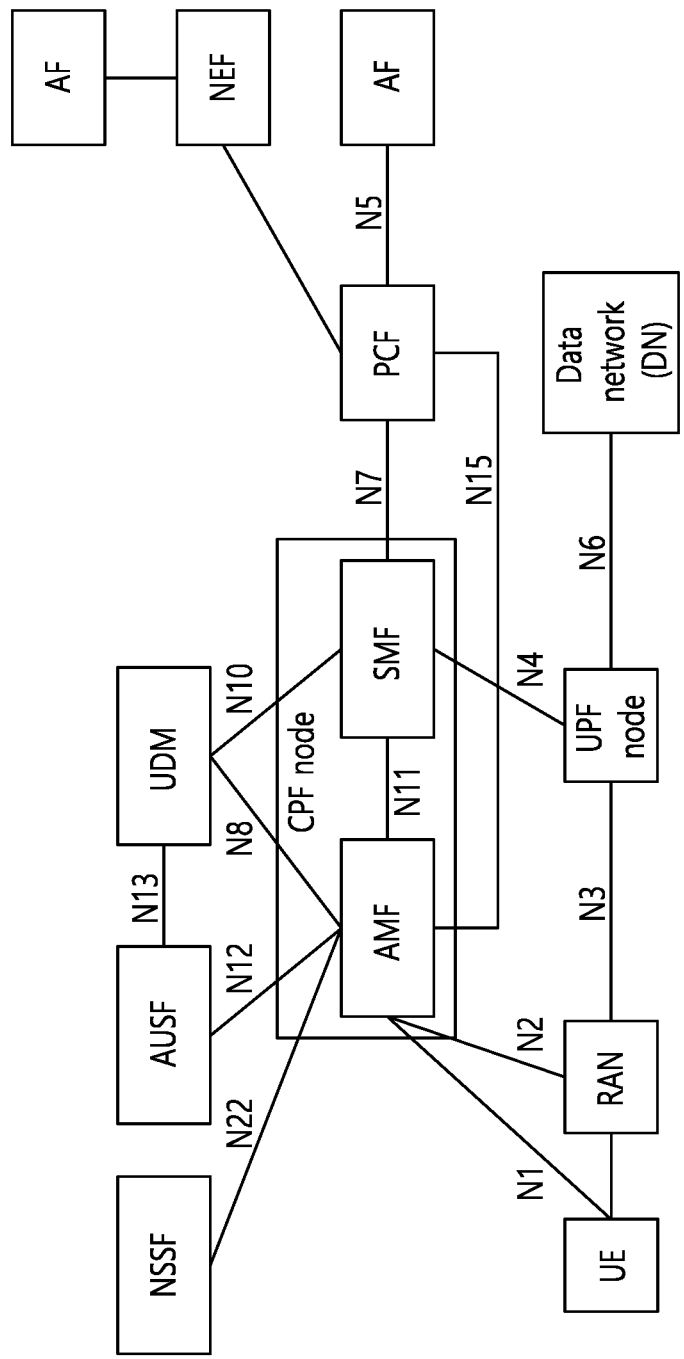
FIG. 2 illustrates an expected structure of next-generation mobile communication from the perspective of a node.

FIG. 2 illustrates an expected structure of next-generation mobile communication from the perspective of a node.

Referring to FIG. 2, a UE is connected to a Data Network (DN) through a next-generation Radio Access Network (RAN).

An illustrated Control Plane Function (CPF) node performs all or some of functions of a Mobility Management Entity (MME) of 4G mobile communication and all or some of functions of control-plane functions of a Serving Gateway (S-GW) and a PDN Gateway (P-GW). The CPF node includes an Access and mobility Management Function (AMF) and a Session Management Function (SMF).

An illustrated User Plane Function (UPF) node is a type of a gateway through which user data is transmitted and received. The UPF node may perform all or some of user-plane functions of the S-GW and the P-GW of 4G mobile communication.

An illustrated Policy Control Function (PCF) is a node that controls a policy of an operator.

An illustrated Application Function (AF) is a server for providing a plurality of services to a UE.

An illustrated Unified Data Management (UDM) is a type of a server that manages subscriber information like a Home Subscriber Server (HSS) of 4G mobile communication. The UDM stores the subscriber information in a Unified Data Repository (UDR) and manages the same.

An illustrated Authentication Server Function (AUSF) authenticates and manages a UE.

An illustrated Network Slice Selection Function (NSSF) is a node for network slicing as described below.

In FIG. 2, a UE can simultaneously access two data networks using multiple Protocol Data Unit (PDU) sessions.

Figure 3:
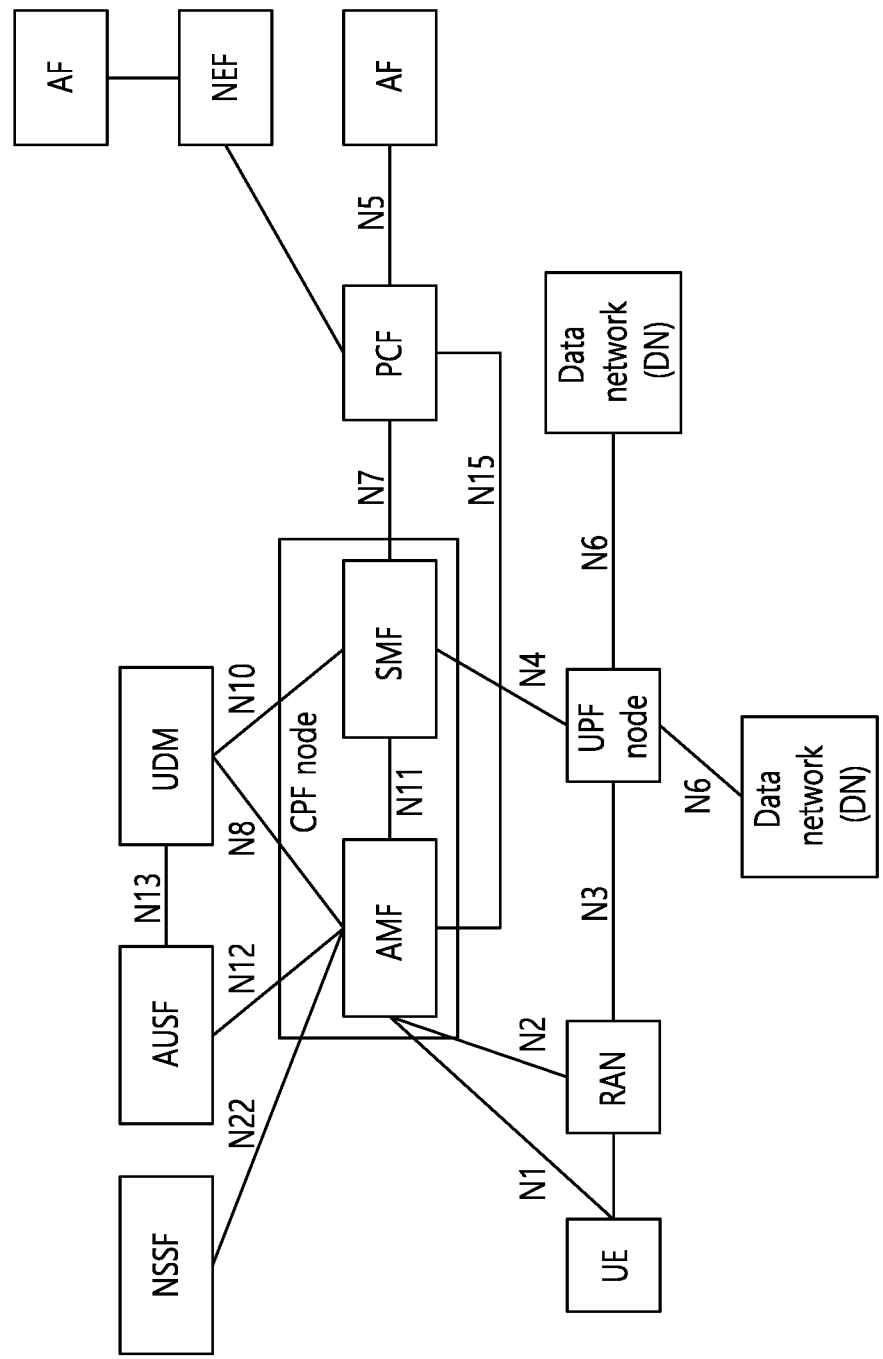
FIG. 3 illustrates an architecture for supporting simultaneous access to two data networks.

FIG. 3 illustrates an architecture for supporting simultaneous access to two data networks.

FIG. 3 shows an architecture for a UE to simultaneously access two data networks using one PDU session.

In FIG. 2 and FIG. 3, an AF by a third party other than an operator may be connected to a 5GC through a Network Exposure Function (NEF).

FIG. 4 illustrates the structure of a radio interface protocol between a UE and a gNB.

The radio interface protocol is based on a 3GPP radio access network standard. The radio interface protocol horizontally includes a physical layer, a data link layer, and a network layer, and vertically includes a user plane for data transfer and a control plane for signal transfer.

The protocol layers may be divided into L1 (first layer), L2 (second layer), and L3 (third layer) based on lower three layers of the Open System Interconnection (OSI) reference model widely known in communication systems.

Hereinafter, each layer of the radio protocol is described.

A physical layer, which is the first layer, provides an information transfer service using a physical channel. The physical layer is connected to an upper medium access control layer through a transport channel, and data is transmitted between the medium access control layer and the physical layer through the transport channel. Data is transmitted between different physical layers, i.e., physical layers of a transmitter and a receiver, through a physical channel.

The second layer includes the Medium Access Control (MAC) layer, a Radio Link Control (RLC) layer, and a Packet Data Convergence Protocol (PDCP) layer.

The third layer includes a Radio Resource Control (hereinafter abbreviated to RRC) layer. The RRC layer is defined only in the control plane and is responsible for control of a logical channel, the transport channel and the physical channels in relation to establishment, reestablishment, and release of a Radio Bearer (abbreviated to RB). Here, the RB refers to a service provided by the second layer for data transfer between a UE and an E-UTRAN.

A Non-Access Stratum (NAS) layer performs functions of session management and mobility management.

The NAS layer is divided into a NAS entity for Mobility Management (MM) and a NAS entity for Session Management (SM).

1) The NAS entity for MM provides the following general functions.

As NAS procedures related to an AMF, the following is included.

Registration management and access management procedures. The AMF supports the following function.

Secure NAS signal connection between a UE and the AMF (integrity protection and encryption)

2) The NAS entity for SM performs session management between a UE and an SMF.

An SM signaling messages are processed, i.e., generated and processed, in NAS-SM layers of the UE and SMF. The content of the SM signaling message is not interpreted by the AMF.

In SM signaling transmission,

The NAS entity for MM generates a NAS-MM message for deriving a method and a location for transmitting the SM signaling message through a security header indicating NAS transmission of SM signaling and received additional information on NAS-MM.

In SM signaling reception, the NAS entity for SM performs an integrity check of the NAS-MM message and interprets the additional information, thereby deriving the method and a location for deriving the SM signaling message.

In FIG. 4, the RRC layer, the RLC layer, the MAC layer, and the PHY layer positioned below the NAS layer are collectively referred to as an Access Stratum (AS).

<Multi-Access Edge Computing (MEC)>

To achieve Ultra-Reliable Low-Latency Communications (URLLC), the European Telecommunications Standards Institute (ETSI) and 5GAA are discussing Multi-access Edge Computing (MEC).

MEC is a network architecture that enables a cloud computing function and an IT service environment on the edge of a cellular network (generally on the edge of any network). The basic idea of MEC is to execute applications and conduct processing operations related to cellular customers, thereby reducing network congestion and enabling the applications to be properly performed. MEC technology is designed to be implemented in a cellular base station or other edge nodes. MEC technology enables flexible and rapid distribution of new applications and new services for customers. MEC enables cellular operators to open a Radio Access Network (RAN) to authorized third parties, such as application developers and content providers.

A MEC server described herein refers to a communication device that provides a cloud computing function or an IT service environment on the edge of a network.

FIG. 5a to FIG. 5d illustrate examples of implementing a MEC server.

In FIG. 5a to FIG. 5d, a UPF node 540 is a type of gateway through which user data is transmitted and received. The UPF node 540 may perform all or some of user-plane functions of a Serving-Gateway (S-GW) and a Packet data network-Gateway (P-GW) of 4G mobile communication. A core network 500 may be an Evolved Packet Core (EPC) or a 5G Core network (5GC). N3 is a reference point between an (R)AN and the UPF node 540. N6 is a reference point between the UPF node 540 and a data network. A base station 200 may be a 5G base station (gNB) or an LTE base station (eNB). The base station 200 may be a base station including both a gNB and an eNB.

Logically, a MEC server (MEC host) 551 may be implemented in an edge or central data network. The UPF node 540 may serve to adjust User-Plane (UP) traffic to a target MEC application (application in the MEC server 551) of the data network. The positions of the data network and UPF may be selected by a network operator. The network operator may deploy physical computing resources based on technical and business parameters, such as available facilities, supported applications, application requirements, and measured or estimated user load. A MEC management system may dynamically determine a position to which a MEC application is distributed by adjusting the operations of the MEC server 551 (MEC host) and the application.

Figure 5A:
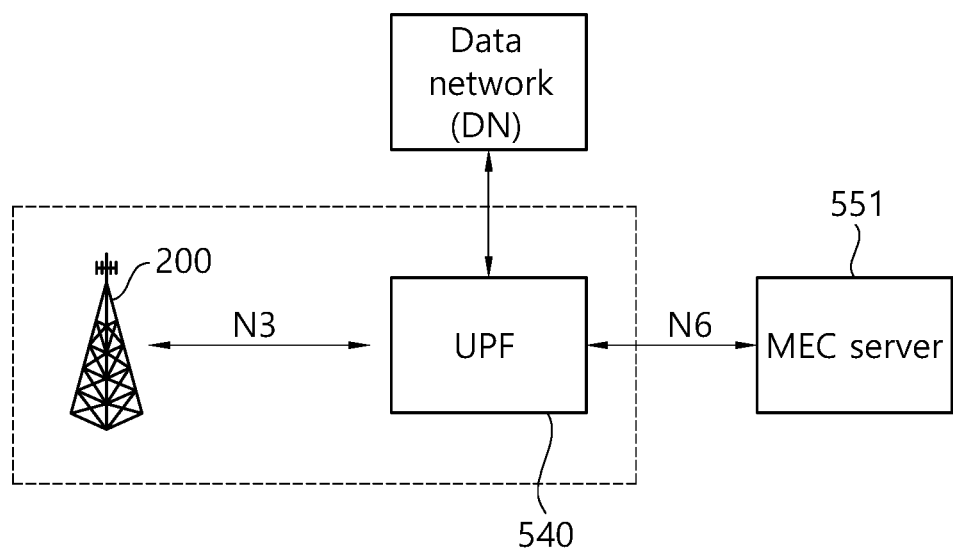
FIG. 5a to FIG. 5d illustrate examples of implementing a MEC server.
Figure 5B:
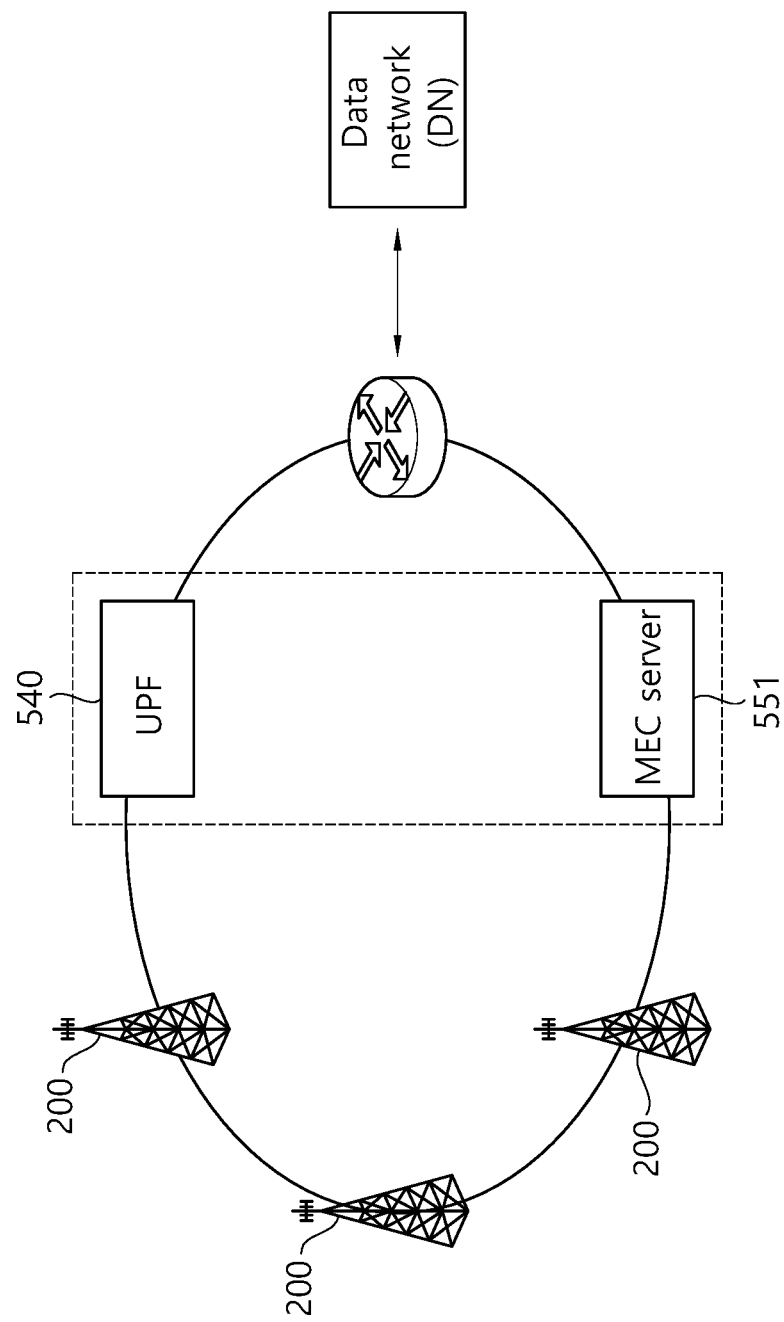
Figure 5C:
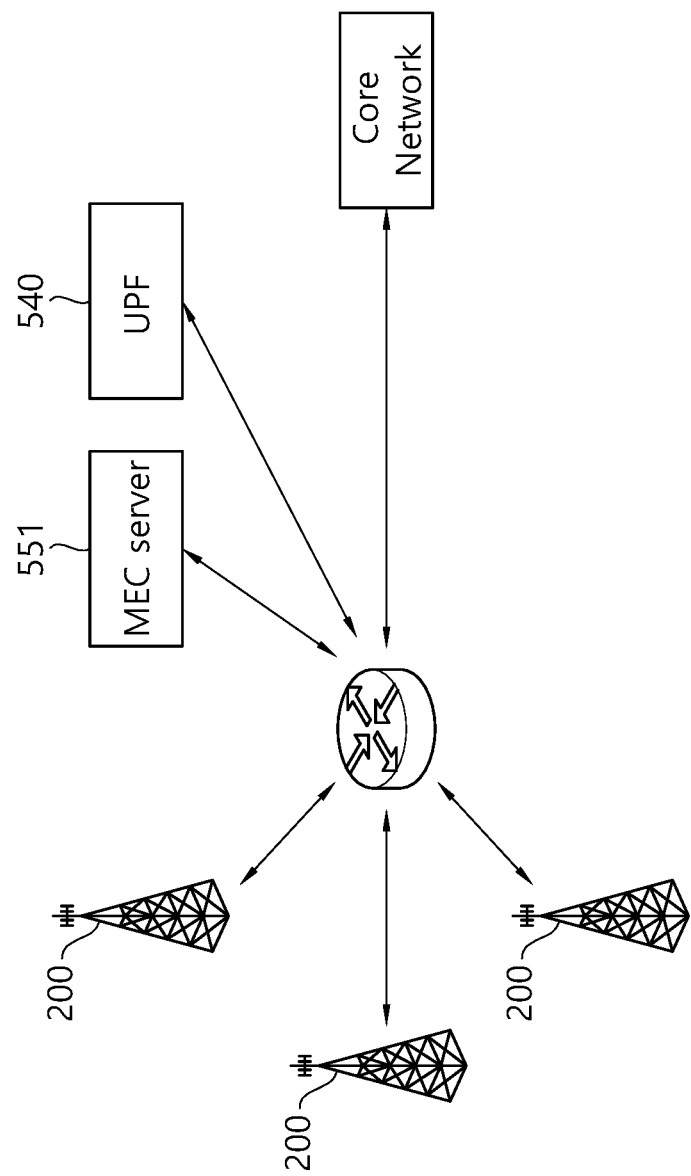
Figure 5D:
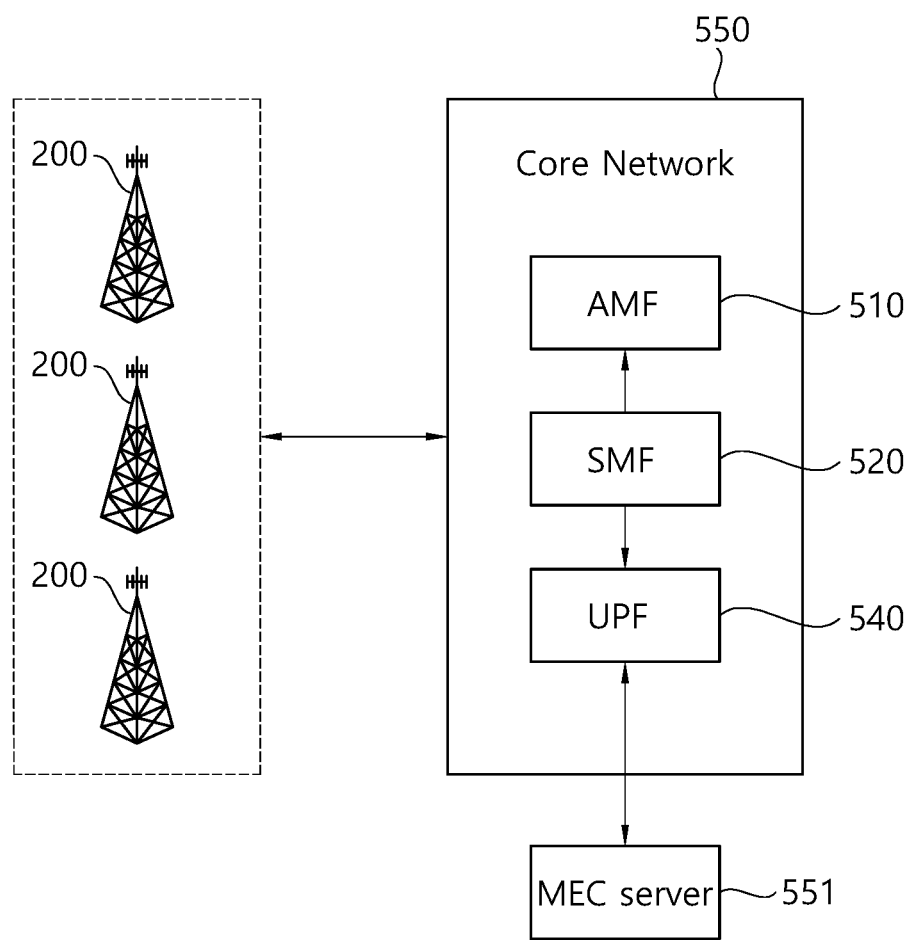

FIG. 5a illustrates an implementation example in which the MEC server 551 and the UPF node 540 are deployed together with the base station 200. FIG. 5b illustrates an implementation example in which the MEC server 551 is deployed together with a transmitting node (e.g., the UPF node 540). In FIG. 5b, the UPF node 540 and the MEC server 551 may communicate through a network aggregation point. FIG. 5c illustrates an implementation example in which the MEC server 551 and the UPF node 540 are deployed together with a network aggregation point. FIG. 5d illustrates an implementation example in which the MEC server 551 is deployed together with Core Network Functions (CPFs). In FIG. 5d, the MEC server 551 may be deployed in the same data center as the core network functions.

<Disclosures of the Present Specification>

According to the disclosure of the present specification, when the MEC server transmits data to the TCU through the base station, the MEC server may select a plurality of heterogeneous antennas. In order to satisfy multiple services requirements (delay, minimum data transmission rate, priority, etc.) requested by the MEC client in the TCU, the MEC server may select a plurality of heterogeneous beams to transmit data.

The MEC server uses the vehicle's location information to allocate to the TCU a channel for direct communication that does not overlap with adjacent TCUs.

When the TCU transmits data to an in-vehicle electronic device, multiple channels are allocated and used to minimize channel interference.

When the TCU transmits data to in-vehicle electronic devices at the same time, a plurality of heterogeneous links (e.g., first 5G communication using sub 6 GHz, second 5G communication using mmWave, communication using LTE, and communication using WLAN) are created. In addition, the same service (data streaming service) may be transmitted to the in-vehicle electronic devices through a plurality of interfaces.

When the TCU receives a safety message (e.g., C-V2X, DSRC) from the MEC server, the safety message is analyzed with the highest priority. When immediate processing is required, the MEC client in the TCU generates an ECU control command message and delivers it to the target ECU to perform an accurate control operation (e.g., brake ECU, etc.).

Figure 6:
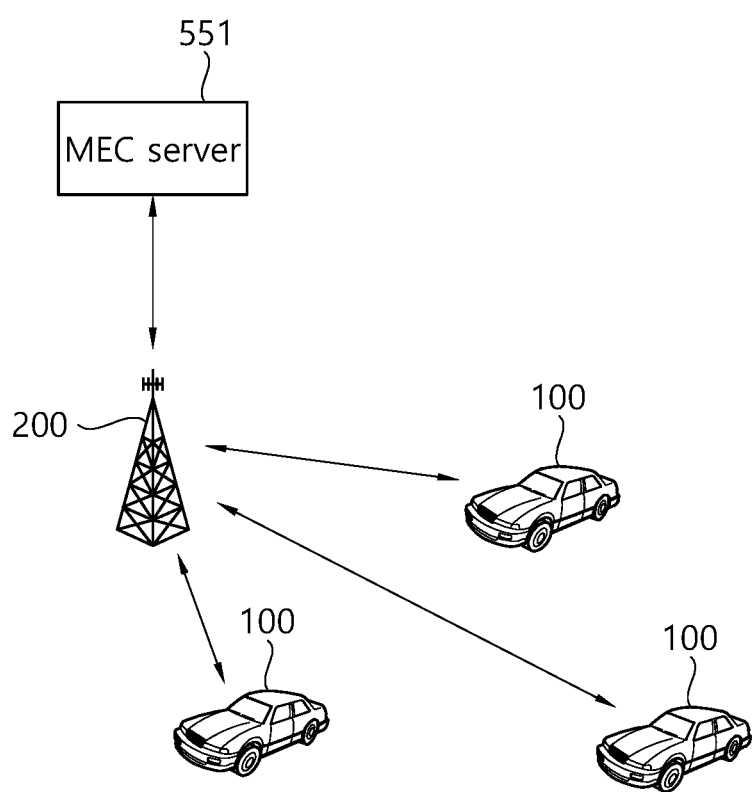
FIG. 6 illustrates an example in which a MEC server remotely controls a vehicle.

FIG. 6 illustrates an example in which a MEC server remotely controls a vehicle.

In FIG. 6, a MEC server 551, a base station 200, and a vehicle are shown. The base station 200 may be a gNB or an eNB. The base station 200 may be a base station including both a gNB and an eNB. The MEC server 551 may be connected to the base station 200 through wired communication or wireless communication. The MEC server 551 may transmit data to the base station 200 or may receive data from the base station 200. Although the drawing shows that the MEC server 551 and the base station 200 are directly connected, which is only for illustration, and the MEC server 551 may be connected to the base station 200 via another network node.

The base station 200 may transmit and receive data to and from a Telematics Communication Unit (TCU) 100 provided in the vehicle.

The TCU 100 may obtain state information from devices provided in the vehicle, and the state information may include various types of sensor data, video data, and the like. The TCU may transmit the state information to the base station 200, and the base station 200 may transmit the state information to the MEC server 551. Then, the MEC server 551 may transmit data for controlling the vehicle to the base station 200 based on the state information. When the base station 200 transmits the data for controlling the vehicle to the TCU 100, the TCU 100 may control the vehicle by transmitting the received data to the electronic devices provided in the vehicle. Further, the MEC server 551 may transmit map information to the base station 200, and the base station 200 may transmit the map information to the TCU. The TCU may control the vehicle using the map information.

The MEC server 551 and the TCU provided in the vehicle will be described in detail with reference to FIG. 7.

Figure 7:
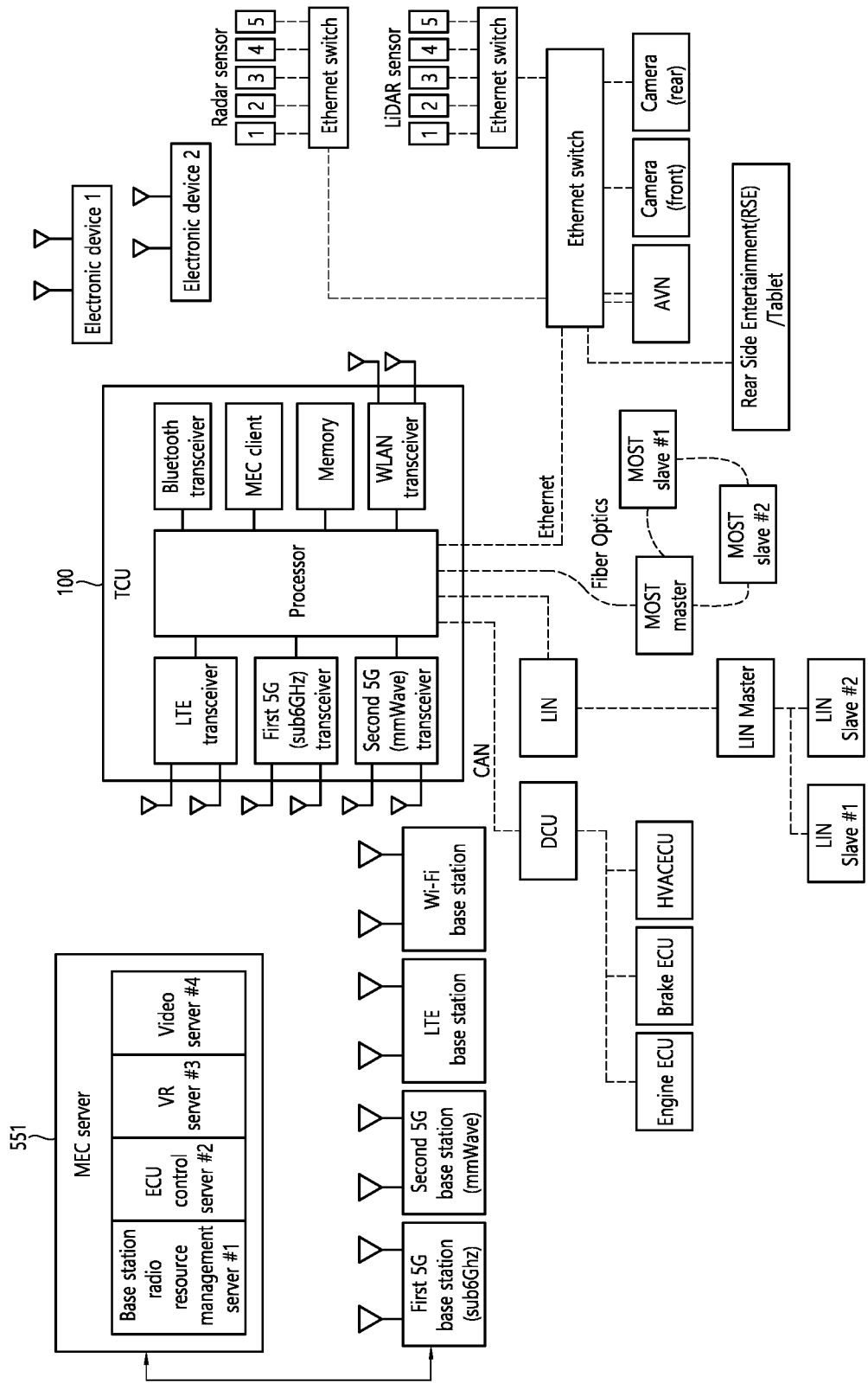
FIG. 7 is a block diagram illustrating an example of an MEC server and an example of a TCU according to an embodiment of the present disclosure.

FIG. 7 is a block diagram illustrating an example of an MEC server and an example of a TCU according to an embodiment of the present disclosure.

The MEC server is the MEC server 551 described with reference to FIG. 5a to FIG. 5d and FIG. 6 and will be described below with the reference numeral omitted.

The MEC server may be implemented as the examples described with reference to FIG. 5a to FIG. 5d. Although FIG. 7 shows that the MEC server communicates directly with the base stations, which is only for illustration, the MEC server may communicate with the base stations through another network node (e.g., a UPF node or a NEF). The MEC server may include a processor (not shown) and a memory (not shown). The memory may store an MEC server application. The processor may perform operations described in embodiments of the present disclosure using the MEC server application stored in the memory.

A first 5G base station (e.g., a 5G base station using sub-6 GHz) is a base station that performs communication based on a 5G standard in a Frequency Range 1 (FR1) band (a frequency band of 7125 MHz or less). A second 5G base station (e.g., a 5G base station using mmWave) is a base station that performs communication based on the 5G standard in a Frequency Range 2 (FR2) band (a frequency band of 24250 to 52600 MHz). An LTE base station performs communication based on an LTE standard. A Wi-Fi Access Point (AP) performs communication based on a Wi-Fi standard. The MEC server may communicate with the TCU using at least one of the first 5G base station (e.g., the 5G base station using sub-6 GHz), the second 5G base station (e.g., the 5G base station using mmWave), the LTE base station, and the Wi-Fi base station.

The TCU includes an LTE transceiver (i.e., an LTE modem/antenna), a first 5G transceiver (i.e., a modem/antenna using sub-6 GHz), a second 5G transceiver (i.e., a modem/antenna using mmWave), a WLAN transceiver (i.e., a Wi-Fi transceiver), a processor, and a memory. The LTE transceiver is a communication module that performs communication based on the LTE standard. The first 5G transceiver (i.e., the modem/antenna using sub-6 GHz) is a communication module that performs communication based on the 5G standard in the FR 1 band. The second 5G transceiver (i.e., the modem/antenna using mmWave) is a communication module that performs communication based on the 5G standard in the FR 2 band. The WLAN transceiver (i.e., the Wi-Fi transceiver) is a communication module that performs communication based on the Wi-Fi standard. The LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver) may be connected to the processor, e.g., through a PCI express (PCIe) interface. Although the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver) are shown as separate entities, one communication module may perform functions of the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver).

The processor of the TCU is connected to the first 5G transceiver (i.e., the modem/antenna using sub-6 GHz), the second 5G transceiver (i.e., the modem/antenna using mmWave), the WLAN transceiver (i.e., the Wi-Fi transceiver), and the memory. The memory may store a MEC client application. The processor may receive data transmitted by the base stations or UEs (UE 1 and UE 2) using the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver). The processor may transmit data to the base stations or the UEs (UE 1 and UE 2) using the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver). The UEs (UE 1 and UE 2) may be wireless communication devices used by a user in the vehicle.

The processor of the TCU may be connected to devices provided in the vehicle. For example, the processor may be connected to a Domain Control Unit (DCU), a Local Interconnect Network (LIN) master, a Media Oriented System Transport (MOST) master, and an Ethernet switch. The processor of the TCU may communicate with the DCU using a Controller Area Network (CAN) communication technology. The processor of the TCU may communicate with the LIN master using a LIN communication technology. The processor of the TCU may communicate with the MOST master connected by fiber optics using a MOST communication technology. The processor of the TCU may communicate with the Ethernet switch and devices connected to the Ethernet switch using an Ethernet communication technology.

The DCU is a device that controls a plurality of ECUs. The DCU may communicate with the plurality of ECUs using the CAN communication technology. Here, a CAN is a standard communication technology designed for microcontrollers or devices to communicate with each other in a vehicle. The CAN is a non-host-bus message-based network protocol mainly used for communication between controllers.

The DCU may communicate with an ECU, such as an engine ECU that controls an engine, a brake ECU that controls a brake, and an HVAC ECU that controls a Heating, Ventilation, and Air Conditioning (HVAC) device. The DCU may transmit data received from the processor of the TCU to each ECU. The DCU may transmit data received from each ECU to the processor of the TCU.

The LIN master may communicate with LIN slaves (LIN Slave #1 and LIN Slave #2) using the LIN communication technology. For example, LIN Slave #1 may be a slave that controls one of a steering wheel, a sunroof, a door, a seat, and a small motor. A LIN is a serial communication technology for communication between components in an automotive network. The LIN master may receive data from the processor of the TCU and may transmit the data to the LIN slaves (LIN Slave #1 and LIN Slave #2). The LIN master may transmit data received from the LIN slaves to the processor of the TCU.

The MOST master may communicate with MOST slaves (MOST Slave #1 and MOST Slave #2) using the MOST communication technology. MOST is a serial communication technology for transmitting audio, video, and control information using an optical cable. The MOST master may transmit data received from the processor of the TCU to the MOST slaves. The MOST master may transmit data received from the MOST slaves to the processor of the TCU.

Ethernet is a computer networking technology used in a Local Area Network (LAN), a Metropolitan Area Network (MAN), and a Wide Area Network (WAN). The processor of the TCU may transmit data to each device through the Ethernet switch using an Ethernet communication technology. Each device may transmit data to the processor of the TCU through the Ethernet switch using the Ethernet communication technology.

Radio detection and ranging (Radar) is a technology for measuring the distance, direction, angle, and speed of a target using radio waves. Radar sensors 1 to 5 are provided in the vehicle to measure the distance, direction, angle, and speed of an object around the vehicle. Radar sensors 1 to 5 may transmit measured sensor data to the processor of the TCU.

Light detection and ranging (LiDAR) is a sensing technology for detecting a remote object and measuring the distance thereof using a light source and a receiver. Specifically, lidar is a technology for measuring the distance, strength, speed, and the like of a target by illuminating the target with a pulsed laser beam and measuring a pulse reflected by a sensor. Lidar sensors 1 to 5 measure the distance, speed, and the like of a target. Lidar sensors 1 to 5 may transmit measured sensor data to the processor of the TCU.

An Audio Video Navigation (AVN) is a device provided in the vehicle to provide a sound, a video, and a navigation function. The AVN may receive data from the processor of the TCU using an Ethernet communication technology and may provide a sound, a video, and a navigation function based on the received data. The AVN may transmit data to the processor of the TCU using the Ethernet communication technology.

A camera (front) and a camera (rear) may capture an image at the front and rear of the vehicle. Although FIG. 7 shows that there are one camera in the front and one camera in the rear, which is only for illustration, cameras may also be provided on the left and right sides. In addition, a plurality of cameras may be provided in each of the front and rear. The cameras may transmit camera data to the processor of the TCU and may receive data from the processor of the TCU using the Ethernet communication technology.

A Rear Seat Entertainment (RSE) refers to a rear seat entertainment system. The RSE is a device mounted behind a passenger seat or behind a driver's seat in the vehicle and provides entertainment for an occupant. A tablet may also be provided in the vehicle. The RSE or tablet may receive data from the processor of the TCU and may transmit data to the processor of the TCU using the Ethernet communication technology.

The MEC server according to an embodiment of the present disclosure may perform a function of receiving/storing/transmitting/analyzing various types of data, such as video/audio/sensor data, which is performed in a conventional cloud server, and a function of managing the TCU and the devices provided in the vehicle.

In the MEC server according to an embodiment of the present disclosure, there may be a MEC server application for performing operations according to various purposes. The MEC server may perform the following functions using the MEC server application.

To comply with regulations, such as the Road Traffic Act, ISO26262 (standard for industrial safety, Road vehicles-Functional safety), or System Architecture Evolution (SAE) standards, the MEC server may monitor operations of the TCU and the ECU in the vehicle. When the operations of the TCU and the ECU in the vehicle violate the regulations, the MEC server controls the operation of the ECU in the vehicle based on a predefined scenario.

The MEC server may perform functions to analyze information on the vehicle (e.g., state information on the devices provided in the vehicle, such as engine ECU-related data, Revolutions Per Minute (RPM) ECU-related data, wheel-related data, brake-related data, and HVAC-related data) received from the TCU in the vehicle and to control the operation of an in-vehicle device connected to the TCU based on a predefined scenario.

The MEC server may monitor the operating state of the TCU and may determine the current state of the TCU. For example, the MEC server may monitor the operating state of the TCU and may determine the current state of the TUC as one of inactive, active, sleeping, and moving states.

The MEC server may receive information on the vehicle (e.g., information on the position of the vehicle) from the TCU and may manage (e.g., collect/analyze/control/record) the position of the vehicle.

The MEC server may receive information on the vehicle (e.g., information on the speed of the vehicle) from the TCU and may manage (e.g., collect/analyze/control/record) the information on the speed of the vehicle. The MEC server may manage the information on the speed of the vehicle to determine whether the vehicle drives too fast, whether the vehicle complies with a safety speed, and the like.

The MEC server may receive information on the vehicle (e.g., engine ECU information) from the TCU and may manage (e.g., collect/analyze/control/record) the engine ECU (engine-controlling ECU) information.

The MEC server may receive information on the vehicle (e.g., information received from the sensors and cameras provided in the vehicle) from the TCU and may manage (e.g., collect/analyze/control/record) vehicular sensor and camera (LiDAR, Radar, and front/rear/measurement/cabin cameras) information.

When the result of analyzing the vehicular sensor and camera information indicates that a collision of the vehicle with a pedestrian, an obstacle, or the like is expected to occur, the MEC server may transmit control data to the TCU based on an emergency response scenario, thereby controlling the ECU (the engine ECU, the brake ECU, and the like) in the vehicle.

Figure 8:
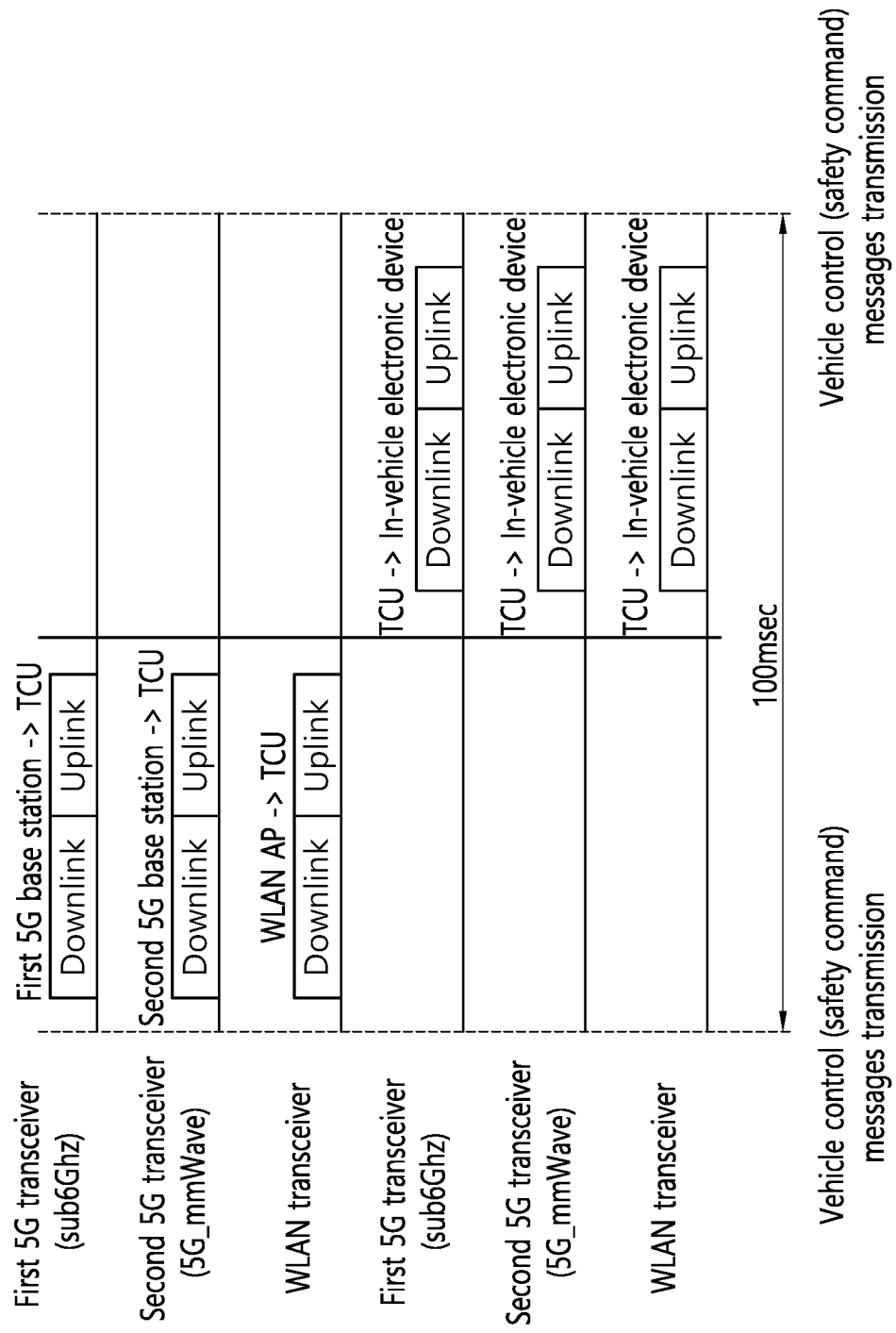
FIG. 8 illustrates an example in which a TCU performs data transmission and reception according to an embodiment of the present disclosure.
Figure 9:
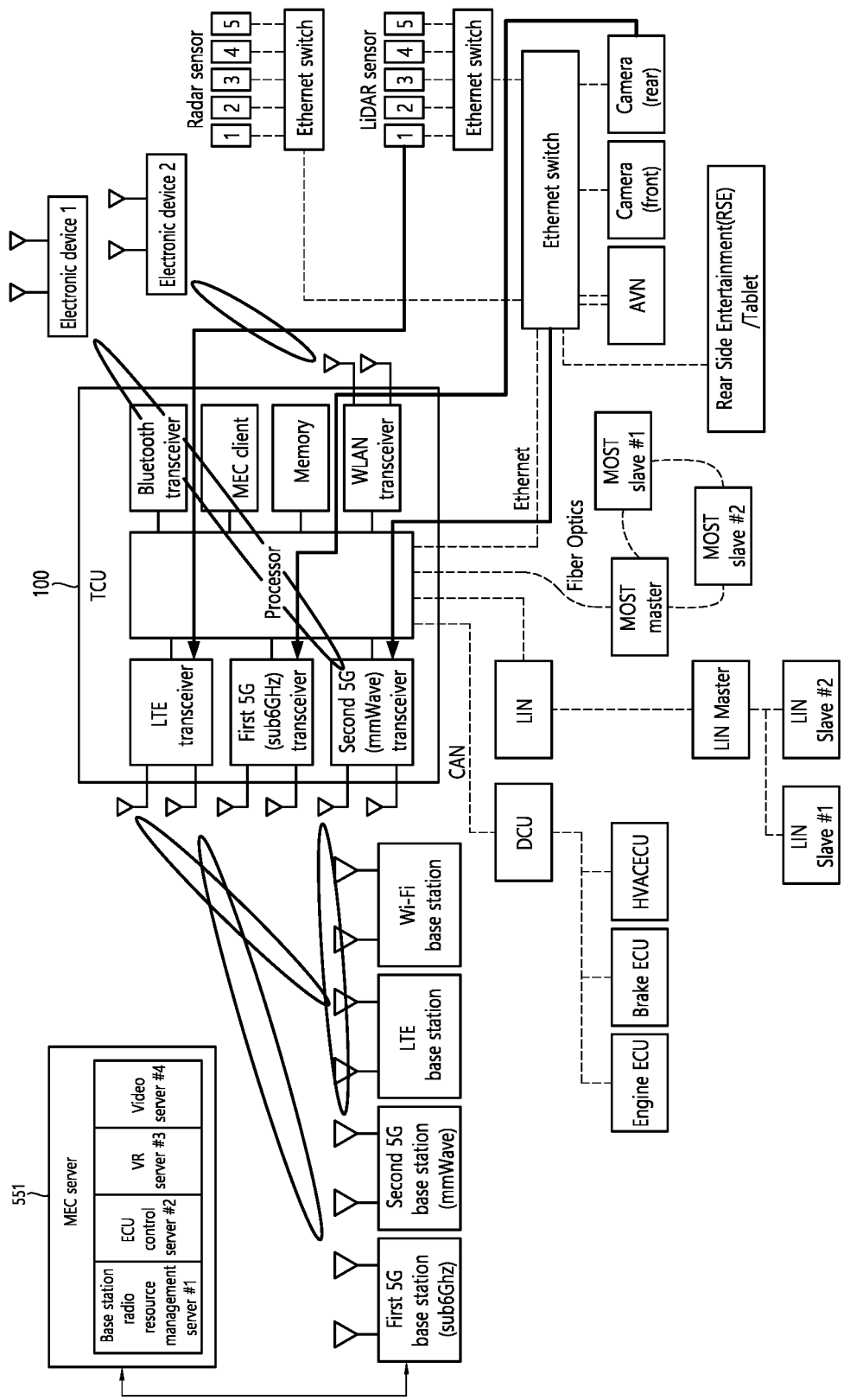
FIG. 9 illustrates transmission and reception paths for the example illustrated in FIG. 8.

FIG. 8 illustrates an example in which a TCU performs data transmission and reception according to an embodiment of the present disclosure. FIG. 9 illustrates transmission and reception paths for the example illustrated in FIG. 8.

According to an embodiment of the present disclosure, communication between a base station and the TCU is performed in a first time period, and communication between the TCU and an in-vehicle electronic device is performed in a second time interval.

Specifically, the base station transmits a plurality of pieces of downlink data to the TCU in a downlink period within the first time period, and the TCU transmits uplink data to the base station in an uplink period within the first time period. And, the TCU transmits downlink data to the in-vehicle electronic device in a downlink period within the second time period, and the in-vehicle electronic device transmits uplink data to the TCU in an uplink period within the second time period.

During the downlink period within the first time period, the TCU simultaneously receives data from a MEC server through base stations using a first 5G transceiver (i.e., a modem/antenna using sub-6 GHz), a second 5G transceiver (i.e., a modem/antenna using mmWave), and an LTE transceiver (i.e., an LTE modem/antenna), and copies the data from a memory in each TCU into a buffer.

Subsequently, during the downlink period within the second time period, the TCU simultaneously transmits the buffered data using at least one of a plurality of communication methods (e.g., LTE communication, 5G communication, WLAN communication, and direct communication), based on a data rate requested by each of a plurality of in-vehicle electronic devices.

As illustrated in FIG. 9, the communication between the base station and the TCU may be performed using at least one of a plurality of communication methods (e.g., LTE communication, 5G communication, and WLAN communication).

The communication between the TCU and the in-vehicle electronic device may be performed using at least one of a plurality of communication methods (e.g., 5G communication, WLAN communication, and wired communication).

Figure 10:
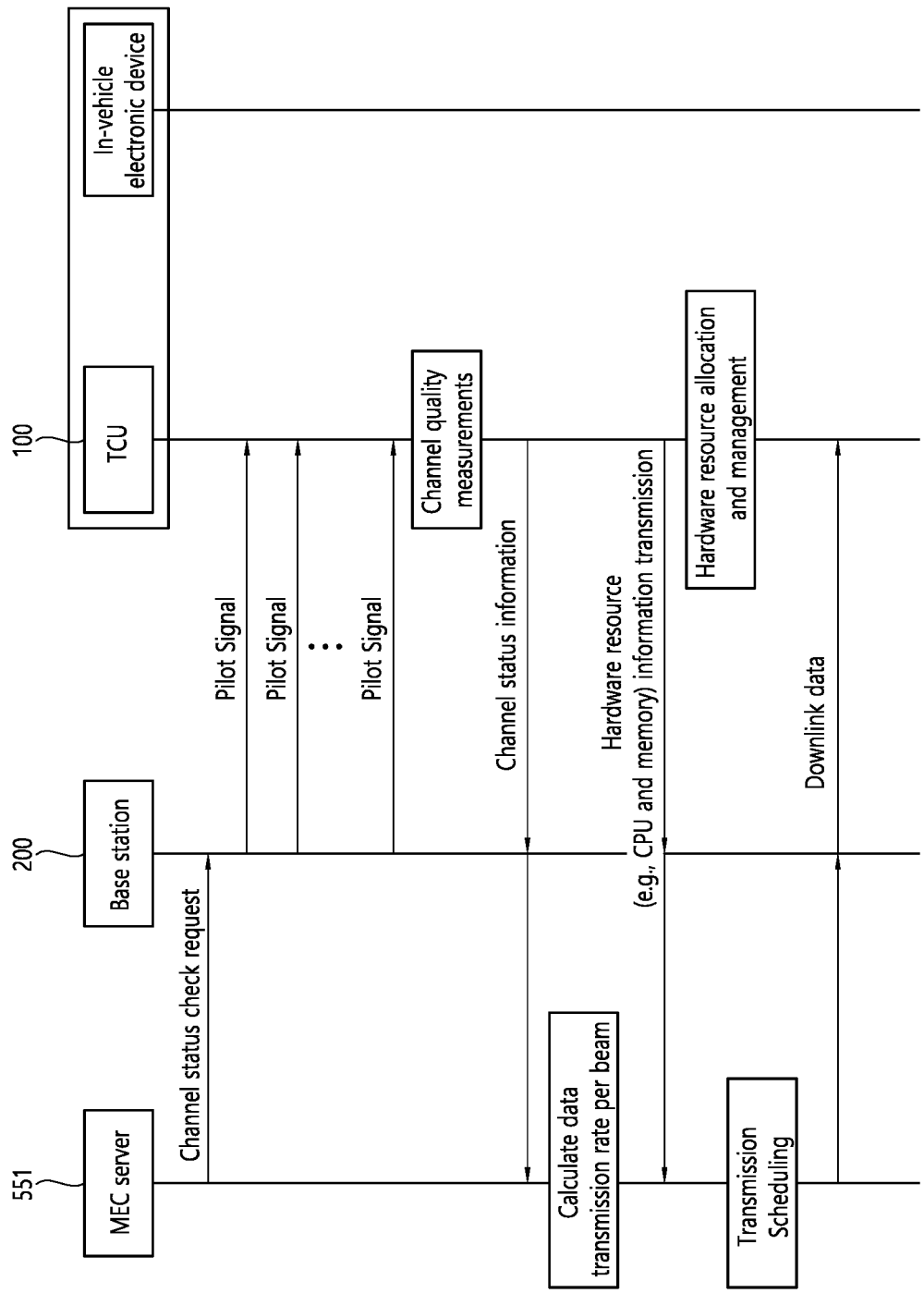
FIG. 10 is an exemplary diagram illustrating an exemplary procedure for a method disclosed in the present specification.

FIG. 10 is an exemplary diagram illustrating an exemplary procedure for a method disclosed in the present specification.

As can be seen with reference to FIG. 10, the MEC radio resource management server in the MEC server 551 transmits to the base station 200 a request to check channel state with the TCU 100. Here, the base station 200 may include at least one of a first 5G base station (i.e., a base station using sub 6 GHz), a second 5G base station (i.e., a base station using mmWave), and an LTE base station.

Then, the base station 200 may transmit a pilot signal. For example, the base station 200 transmits one or more of a pilot signal using the first 5G communication (i.e., communication using sub 6 GHz), a pilot signal using the second 5G communication (i.e., communication using mmWave), and a pilot signal using LTE, respectively.

The TCU 100 measures channel quality based on the received pilot signal. For example, the TCU 100 may measure the first channel quality based on the pilot signal using the first 5G communication (i.e., communication using sub 6 GHz), may measure the second channel quality based on the pilot signal using the second 5G communication (i.e., communication using mmWave), and may measure the third channel quality based on the pilot signal using LTE.

The TCU 100 reports channel status information based on the measured channel quality. The channel status information may include a Channel Quality Indicator (CQI).

The MEC server 551 determines the characteristics of a downlink beam, and calculates a data rate for each beam. Specifically, the MEC server 551 generates a data rate group, $R=\{R_{i,j,1}(t), \ldots, R_{i,j,k}(t), \ldots, R_{i,j,kmax}(t)\}$.

Here, the signs are as follows.
i represents the index of TCU-i.
j is an index for each type of antenna (e.g., 1=antenna for the first 5G transceiver using mmWave, 2=antenna for the second 5G transceiver using sub 6 GHz, 3=antenna for LTE, 4=antenna for WLAN).
k is an antenna sequence index.

The MEC client in the TCU 100 transmits hardware resource information to the MEC server 551. For example, the MEC client in the TCU 100 transmits information on the number of cores of the application processor and the maximum CPU clock and idle resource rate (%) for each core.

For example, the resource manager application operating inside the modem for the first 5G transceiver, the second 5G transceiver, and the LTE transceiver determines the size of the internal hardware memory of each transceiver, and allocates a transmission (Tx) buffer and a reception (Rx) buffer to be used for each antenna. This will be described later in detail with reference to FIG. 18.

The MEC client in the TCU 100 allocates and manages hardware resources for downlink data reception. Specifically, the MEC client in the TCU 100 allocates and manages a job for each core of the application processor.

After performing radio resource and time scheduling for downlink data to be transmitted to the TCU 100, the base station 200 transmits downlink data.

Figure 11:
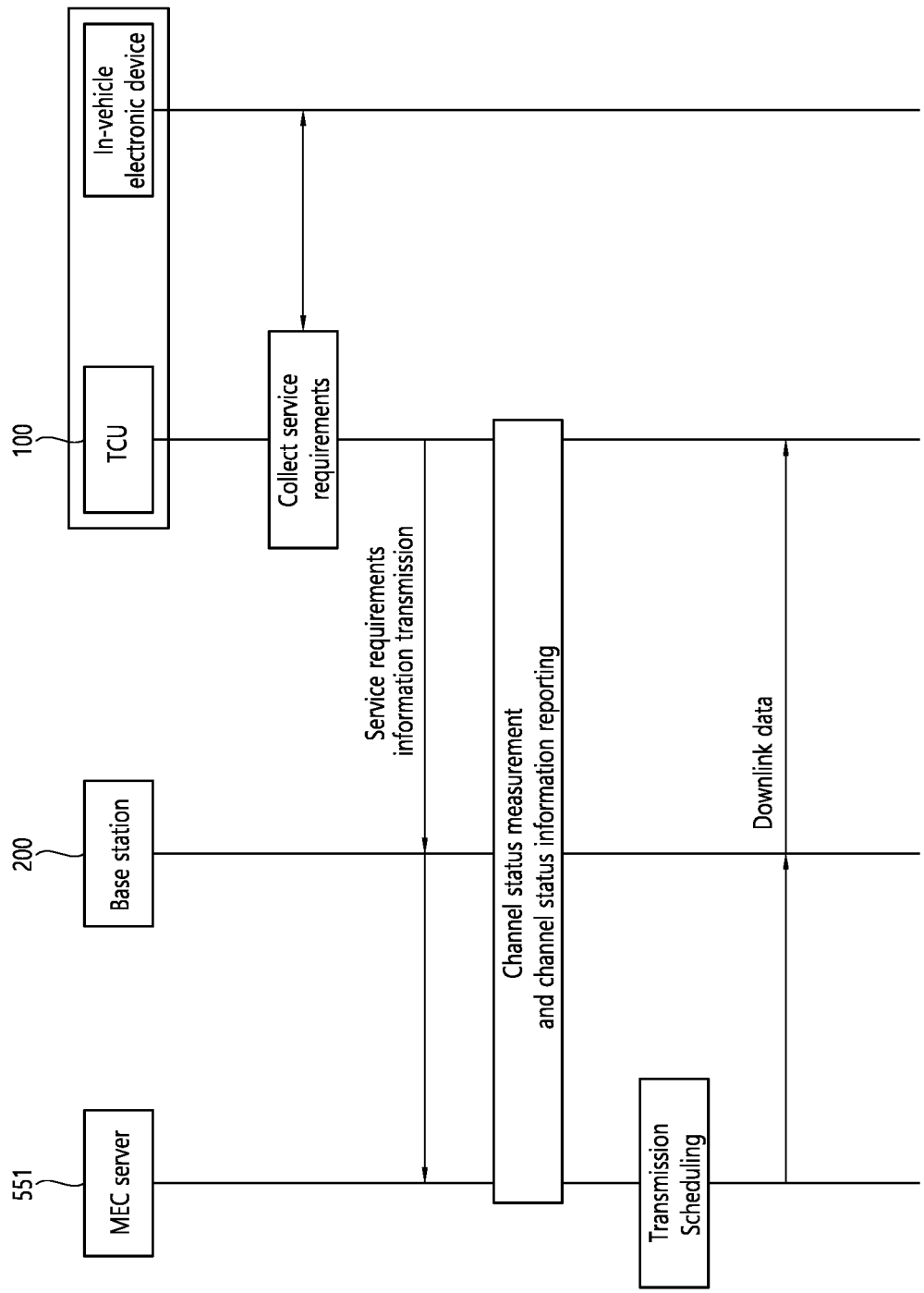
FIG. 11 is an exemplary diagram illustrating an exemplary procedure for a method disclosed in the present specification.

FIG. 11 is an exemplary diagram illustrating an exemplary procedure for a method disclosed in the present specification.

The MEC client in the TCU 100 collects service requirements from electronic devices wirelessly connected to ECUs and to electronic devices (e.g., Informant) connected via Ethernet. The collected service requirements may be expressed as follows.

$$S_{i,m,n}(t)=(\text{min Data Rate}(r_{i,m,n}(t)), \text{Delay Requirement}(D_{i,m,n}(t))), \text{Service\_ID,Tag(Traffic Type)}) \quad \text{[Equation 1]}$$

The MEC client in the TCU 100 may generate information on the service requirements of the TCU-i for each group and then transmit it to the MEC server 551. The information on the service requirements generated for each group may be expressed as follows.

$$S_i(t)=\{S_{i,m,n}(t), \ldots S_{i,m,n}(t), \ldots S_{i,m,n\_max}(t)\} \quad \text{[Equation 2]}$$

Here, the signs are as follows.
i represents the index of TCU-i.
j is an index for each type of antenna (e.g., 1=antenna for the first 5G transceiver using mmWave, 2=antenna for the second 5G transceiver using sub 6 GHz, 3=antenna for LTE, 4=antenna for WLAN).
k is an antenna sequence index.
M is the index of the target device (e.g., the index of the wireless device or the index of the ECU).
n is the sequence index of the device.
p is a tag index indicating the type of data.
q is the priority index for each tag.
$S_{i,p,q}(t)$ represents the group having the qth priority of p-Tag of TCU-i. Taking ECU-CAN as an example, RPM-CAN and Brake-CAN have the same tag as ECU (CAN), but the priority may be different as Brake-CAN=1, RPM-CAN=2.

B(t) represents an available beam group and may be expressed as follows.

$$B(t)=\{B_{i,j,k\_1^*}, B_{i,j,k^*}, \ldots, B_{i,j,k\_max^*}\} \quad \text{[Equation 3]}$$

Here, $B_{i,j,k}$ indicate the size of the register for the beam.

After the base station broadcasts pilot signals from all heterogeneous antennas mounted on the base station, the MEC server 551 receives the CQI table index value sent by the TCU 100, and configures the data rate group R(t)= $\{R_{i,j,l}(t), \ldots R_{i,j,k}(t), \ldots, R_{i,j,kmax}(t)\}$ of each beam, and sort in the order of the largest data rate. In this case, the first element may have the largest data rate.

The service requirement group $S_i(t)$ is grouped into subgroups again based on the services with the same tag. For example:

$$S_{i,p,1}(t)=\{S_{i,m,1}(t), \ldots, S_{i,m,n}(t)\}, S_{i,p,2}(t)=\{S_{i,m,3}(t), \ldots, S_{i,m,n}\},$$

$$S_{i,p,3}(t)=\{S_{i,m5}(t), \ldots, S_{i,m+1,n+1}(t)\}, S_{i,pmax}(t)=\{S_{i,m,6}(t), \ldots, S_{i,m+2,n+2}(t)\} \quad \text{[Equation 4]}$$

Then, all elements of $S_{i,p,q}(t)$, which are subgroups sharing the same tag, are sorted in the order of the least delay requirement.

Meanwhile, as shown in FIG. 10, the TCU 100 performs channel state measurement and transmits the channel state information to the MEC server 551 through the base station 200.

The base station 200 performs radio resource and time scheduling for downlink data to be transmitted to the TCU 100.

It is calculated by adding up the total amount of data to be transmitted in downlink to TCU-i.

$$S_i(t)=\Sigma_{p=0}^{p=p\_max}\Sigma_{q=0}^{q=q\_max}S_{i,p,q}(t)$$

$$S_i(t)>\Sigma_{j=0}^{j=j\_max}\Sigma_{k=0}^{k=k\_max}R_{i,j,k}(t) \quad \text{[Equation 5]}$$

The MEC server 551 transmits data using the selected beam group. The selected beam group may be as follows.

$$(B(t)=\{B_{i,j^*,k\_1^*}, B_{i,j^*,k^*}, B_{i,j,*k\_max^*}\})$$

Figure 12:
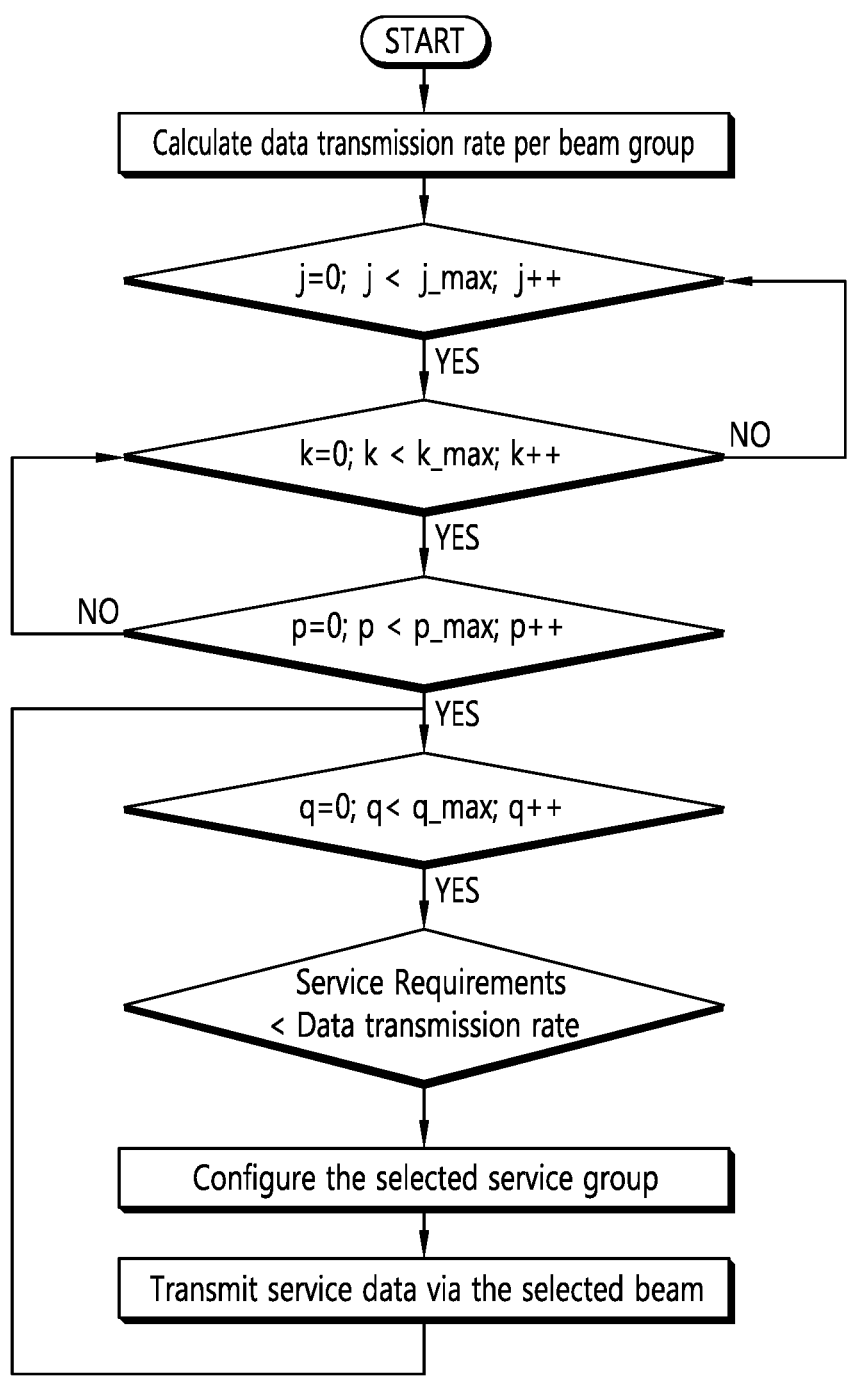
FIG. 12 is an exemplary diagram illustrating an exemplary procedure for a method disclosed in the present specification.

FIG. 12 is an exemplary diagram illustrating an exemplary procedure for a method disclosed in the present specification.

The MEC server 551 calculates a data rate corresponding to a beam group (e.g., B(t)).

The beam group is as follows.

$$B(t)=\{B_{i,j,k\_1^*}, B_{i,j,k^*}, B_{i,j,k\_max^*}\}$$

$B_{i,j,k}$ indicates the size of the register for the beam.
And a data rate group is configured. For example:

$$R_2(t)=\{R_{i,j^*,k\_1^*}, R_{i,j^*,k^*}, R_{i,j^*,k\_max^*}\}$$

Here, the elements are sorted in order of highest data rate.
The selected service group is defined as $S_2(t)=\{\ \}$.
Then, it is repeated using the for clause.
j=0; j<j_max; j++
k=0; k<k_max; k++
p=0; p<p_max; p++
q=0; q<q_max; q++ j is an index for each type of antenna (e.g., 1=antenna for the first 5G transceiver using mmWave, 2=antenna for the second 5G transceiver using sub 6 GHz, 3=antenna for LTE, 4=antenna for WLAN).

k is an antenna sequence index.
p is a tag index indicating the type of data.
q is the priority index for each tag.

And whether the service requirements are lower than the data rate is checked.
Specifically, the MEC server 551 confirms as follows.

$$\Sigma_{b=1}^{b=q}S_{i,p,q}(t)<R_{i,j^*,k^*} \quad \text{[Equation 6]}$$

The MEC server 551 configures the selected service group $S2(t)=\{S_{i,p,i}(t), S_{i,p,2}(t), \ldots, S_{i,p,q}(t)\}$.

Then, the service data $\{S_{i,p,l}(t), S_{i,p,2}(t), \ldots, S_{i,p,q}(t)\}$ is transmitted through the selected beam $B_{i,j^*,k^*}$.

The transmitted service data $\{S_{i,p,i}(t), S_{i,p,2}(t), \ldots, S_{i,p,q}(t)\}$ is deleted from the service group S(t).

The beam used for the transmission (e.g., $B_{i,j^*,k^*}$) is also deleted from the available beam group B(t).

Figure 13:
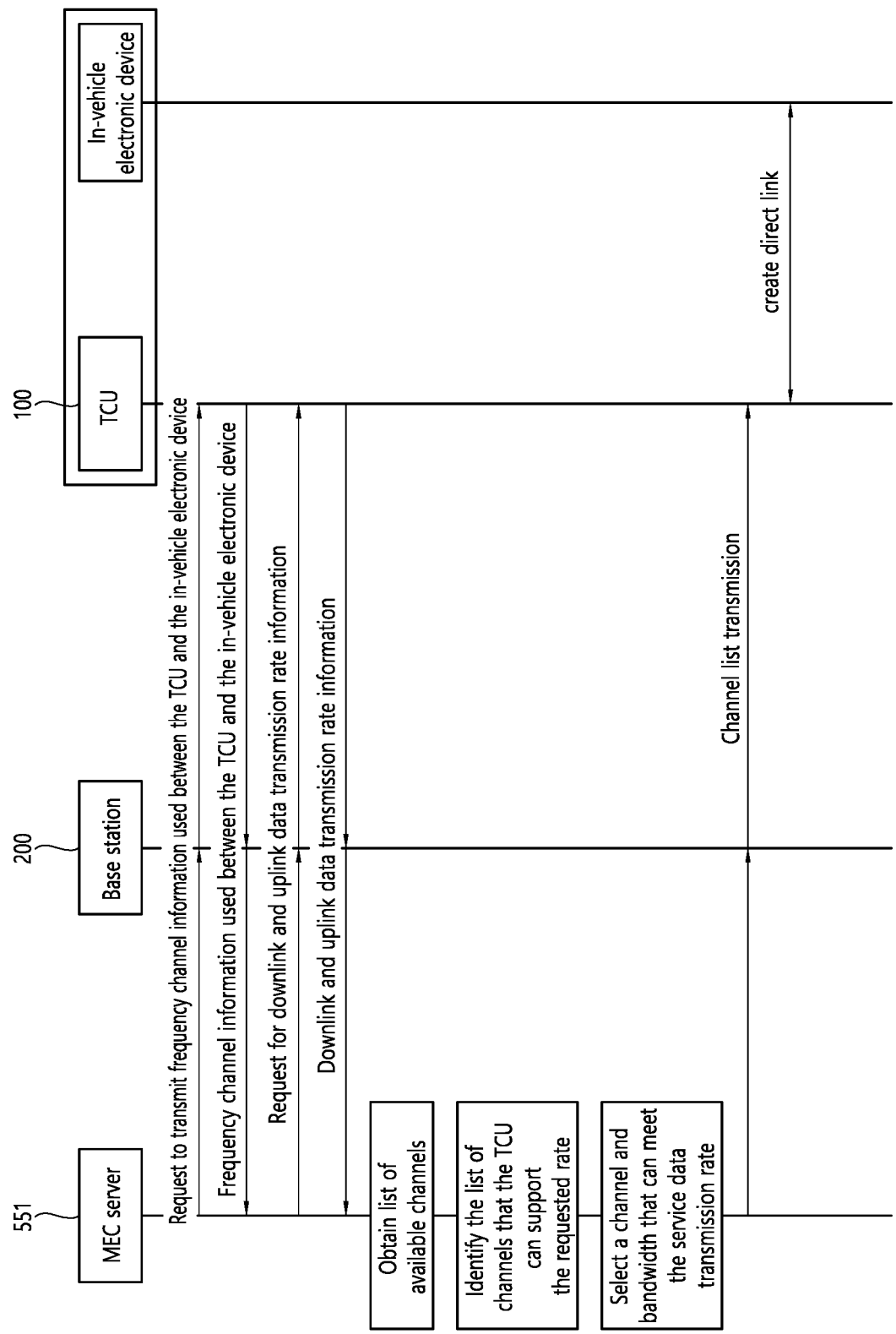
FIG. 13 is an exemplary diagram illustrating an exemplary procedure for a method disclosed in the present specification.

FIG. 13 is an exemplary diagram illustrating an exemplary procedure for a method disclosed in the present specification.

The procedure shown in FIG. 13 relates to a method for the MEC server to adjust so that frequency channels to be used do not overlap each other when performing direct communication between the TCU and the in-vehicle electronic devices.

First, the MEC server 551 requests all TCUs connected to the base station 200 to transmit information on a frequency channel used by the TCU for communication with an in-vehicle electronic devices and obtains it.

The MEC server 551 requests and obtains information on the data transmission rate to be downloaded and the data transmission rate to be uploaded from the MEC client in the TCU 100.

The MEC client in the TCU 100 informs the MEC server 551 of a total data rate obtained by adding up all data rates for services requested by the in-vehicle electronic devices.

The total data rate may be expressed as follows.

$$\sum_{v=1}^{v=v\_max} \sum_{w=1}^{w=w\_max} S_{i,v,w}(t) \quad \text{[Equation 7]}$$

In addition, the MEC server 551 obtains a list of available channels.

The MEC server 551 identifies a list of channel indexes ($C_i(t)$) capable of supporting the data rate requested by the TCU-i in the uplink/downlink.

The MEC server 551 may transmit to the TCU a list of channels that can be used for the target TCU-i among unused channels.

At this time, considering the combination of the bandwidth of the corresponding channel and the beams of the heterogeneous antennas allocated to the target TCU-i, channels (multiple numbers) and bandwidth that can satisfy the data rate of the service requested by a specific TCU-I are allocated. Channel allocation will be described later with reference to FIG. 14.

The MEC server 551 transmits a list of channels $C_i(t)$ to the MEC client in the TCU 100.

The MEC client in the TCU 100 informs the in-vehicle electronic device of the channel information about the channel allocated from the MEC server 551, and creates a direct link with the electronic device through the channel.

Figure 14:
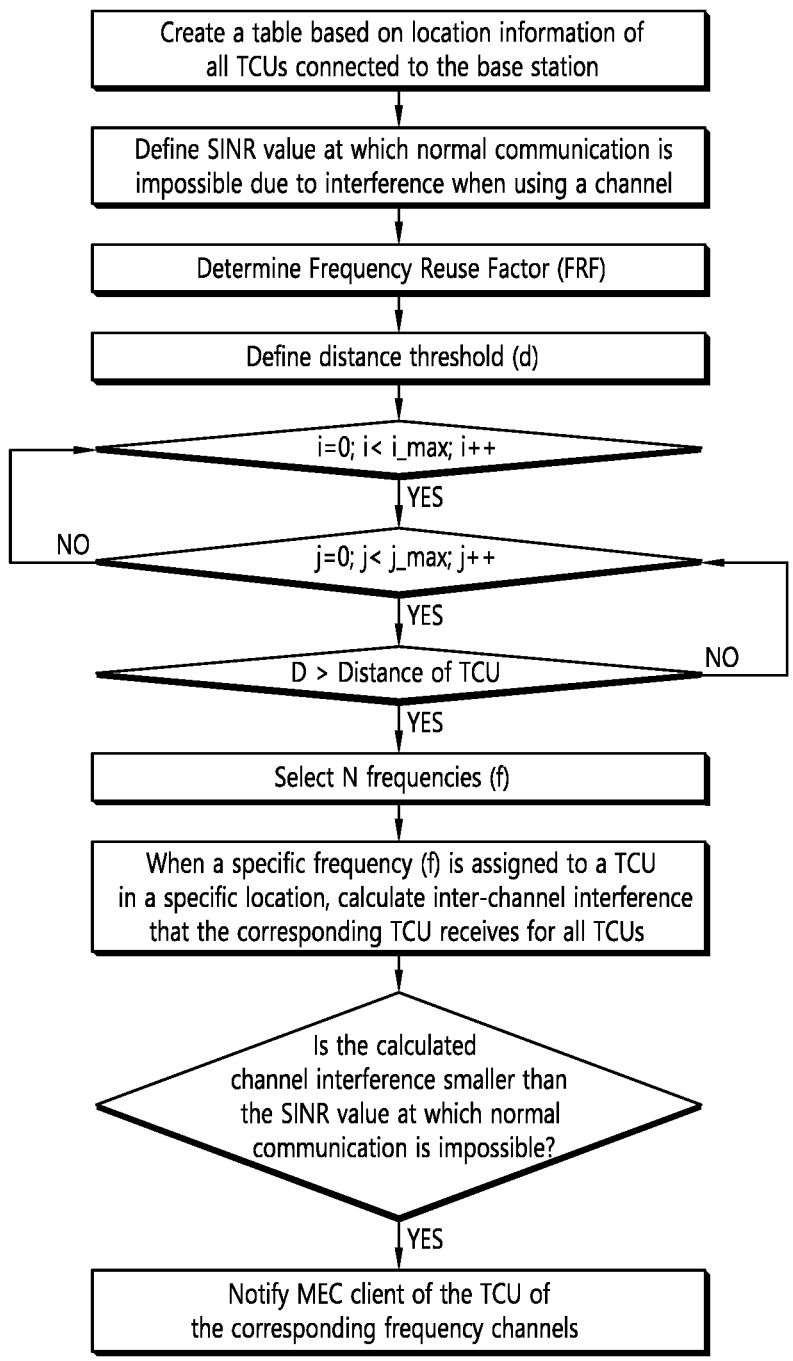
FIG. 14 is an exemplary diagram illustrating an exemplary procedure for a method disclosed in the present specification.

FIG. 14 is an exemplary diagram illustrating an exemplary procedure for a method disclosed in the present specification.

The MEC server 551 creates a table based on location information of all TCUs (vehicles) currently connected to the base station.

The MEC server 551 defines an SINR value (e.g., $SINR_0(t)$) of a signal for which normal communication is not possible due to interference when using the same channel.

The MEC server 551 determines a Frequency Reuse Factor (FRF). Here, the FRF may mean dividing the available channel bands into FRFs.

The distance threshold (d) is defined.
Then, it is repeated using the for clause.

i=0; i<i_max; i++
j=0; j<j_max; j++
Then, the MEC server 551 checks whether the distance of the TCU is within the distance threshold.

$$d > \sqrt{\|x_i(t)-x_j(t)\|^2 + \|y_i(t)-y_j(t)\|^2} \text{ and check the number of TCUs } N \quad \text{[Equation 8]}$$

Here, the signs are as follows.

i represents the index of TCU-i.

j is an index for each type of antenna (e.g., 1=antenna for the first 5G transceiver using mmWave, 2=antenna for the second 5G transceiver using sub 6 GHz, 3=antenna for LTE, 4=antenna for WLAN).

d is the distance threshold.

The x and y are position coordinates.

And the MEC server 551 selects N frequencies (f). Specifically, it is as follows.

f=f_i(t); f∈ F(t); The MEC server 551 may select N number of f.

TABLE 1

| Distance | Channel |
|---|---|
| 10 | f1 |
| 10 | f2 |
| 20 | F3 |
| 20 | F4 |

This is an example of channel allocation when the FRF=4.

The MEC server 551 calculates, for all TCUs, the channel interference received by the TCU-i when a specific frequency f is assigned to the TCU-i at a specific location as follows.

$$S(t) = \sum_{k=f1}^{i=f_{ali}} \frac{P0(t)}{ri, j^2(t)} \quad \text{[Equation 9]}$$

If the channel interference is smaller than the SINR value for which the normal communication is not possible, the MEC server 551 notifies the MEC client in the TCU 100 of information on the corresponding frequency channels.

Figure 15A:
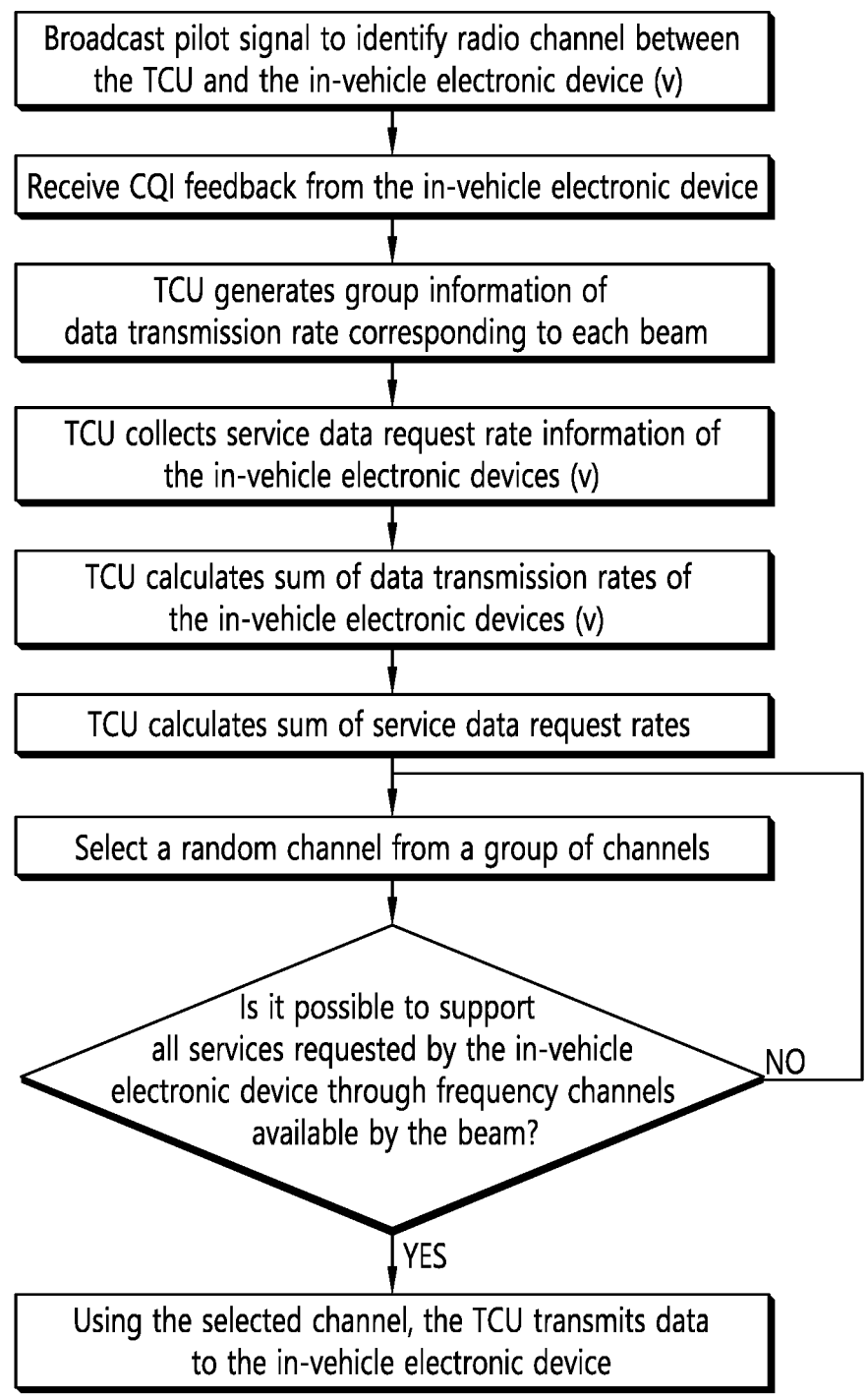
FIG. 15a is an exemplary diagram illustrating an exemplary procedure for a method disclosed in the present specification.
Figure 15B:
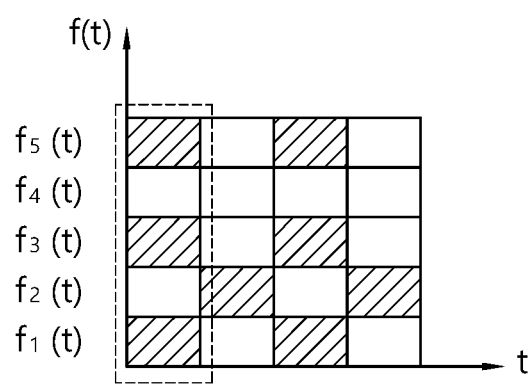
FIG. 15b illustrates an example of available frequency channels.

FIG. 15a is an exemplary diagram illustrating an exemplary procedure for a method disclosed in the present specification, and FIG. 15b illustrates an example of available frequency channels.

The MEC client in the TCU 100 broadcasts a pilot signal in order to identify a radio channel between the TCU and the in-vehicle electronic devices (v).

When the in-vehicle electronic devices (v) feed back the CQI table index value, the MEC client in the TCU 100 generates a group of data rates $X_i(t)=\{x_{i,y,1}(t), x_{i,y,z}(t), \ldots, x_{i,y,z\_max}(t)\}$ corresponding to each beam of the corresponding TCU (i.e., TCU-i).

The MEC client in the TCU 100 collects service data requirements rates of the in-vehicle electronic devices (v).

And, the MEC client in the TCU 100 calculates the sum of the data rates of the service group as follows.

$$S_{i,v}(t) = \sum_{w=1}^{w=w_{max}} S_{i,v,w}(t) \quad \text{[Equation 10]}$$

The MEC client in the TCU 100 selects an arbitrary channel from a group of channels (i.e., F(t) group). Specifically, the MEC client in the TCU 100 sorts in the order of the smallest value among the groups of channels (i.e., the F(t) group), selects the smallest channel number f*(t), and then put it in the temporary F2(t)={ } group.

$$X_{i,y,z}(F_2(t)) < \sum_{i=0}^{i=i\_max} S_{i,v}(t) \quad \text{[Equation 11]}$$

The MEC client in the TCU 100 determines whether all services requested by the in-vehicle electronic devices can be supported by using available frequency channels.

If it is possible to support all services requested by the in-vehicle electronic devices using available frequency channels, the MEC client in the TCU 100 transmits data to the in-vehicle electronic devices using the corresponding channel.

If the data rate, which is the sum of the data rates of the available frequency channel group ($F_2(t)$) in which the available frequency channels are gathered, is smaller than the data rate of all the services (VR, AR, video) of the in-vehicle electronic devices, the MEC client in the TCU 100 repeats the process of adding one more available frequency channel.

In the above formulas, the signs are as follows:

i: index of TCU-i v: the index number of the in-vehicle electronic device

W: service index number $S_{i,v,w}(t)$: Service data rate requirement for service (w) of in-vehicle electronic device (v) communicating with TCU-i $S_{i,v}(t)$: a group of service data rates for service (w) of the in-vehicle electronic device (v) communicating with the TCU-i $$S_{i,v}(t)=\{S_{i,v,w\_1}(t), \ldots, S_{i,v,w}(t), \ldots, S_{i,v,w\_max}(t)\}$$

y: the type number of the TCU's antenna (modem)

z: antenna index number $x_{i,y,z}(t)$: the data rate when the antenna (modem) type (y) of TCU-i and the antenna index is z $B_{i,y,z}(t)$: the beam when the antenna (modem) type (y) of TCU-i and the antenna index is z $X_i(t)$: A group of data rates when using a beam between the TCU and the in-vehicle electronic device (v).

$$(X_i(t)=\{x_{i,y,i}(t), x_{i,y,z}(t), \ldots, x_{i,y,z\_max}(t)\})$$

a: available frequency channel index

F(t): A group of available frequency channels, $F(t)=\{f_1(t), f_2(t), \ldots, f_a(t), f_N(t)\}$ $x_{i,y,z}(F(t))$: the data rate when using the frequency channel list when using the corresponding beam $X_{i,a}(t)$: TCU-i using fa(t), corresponding beam $B_{i,y,z}(t)$ Hereinafter, a technology for the TCU to transmit to in-vehicle electronic devices through a plurality of wireless links at the same time will be described.

The MEC client in the TCU stores data received from the base station in a buffer and transmits it to a specific in-vehicle electronic device. At this time, the same service data stored in the buffer inside the TCU is simultaneously transmitted to a plurality of radio interfaces.

A detailed operation is as follows.

When data flows from the modem's hardware memory through an interface (e.g., PCI Express bus), the first core of the application processor sees the sender IP address and the tag of the received message and stores the message in a buffer per each tag. By referring to tags and priority table values, ECU messages with high priority are converted into control commands such as CAN, LIN, Flexray, etc., and then transmitted to the target device through the corresponding controller.

Simultaneously with performing the above operation, the second core of the application processor executes the resource manager application inside the modem. The resource manager application attaches the header (receiver address) of the target device for direct communication to the packet stored in the transmission buffer (e.g., Tx_Buffer(t)) located on the memory in the modem, and invokes the register (packet, antenna beam number (B1(t)) in order to transmit through the allocated type of antenna (e.g., 5G_mmWave, B1(t), etc.).

At this time, the resource manager application checks the information (receiver IP address, MAC address, data tag) of data stored in the transmission buffer (e.g., Tx_Buffer) and the priority of the tag, and then according to the priority order of each traffic of the video, AR, audio, (when executing the register command) packets are cut into a predetermined size, and then the target device address is attached to the header and transmitted to the in-vehicle electronic devices.

If one piece of data is large in size and it is impossible to transmit all of the data wirelessly through one antenna beam, the antenna type with the highest data rate (e.g., 5G_mm-Wave, 5G_sub6 Ghz, LTE, Wi-Fi) is selected, and an antenna beam (B2(t)) that provides the highest data rate among the selected antennas is allocated.

Figure 16:
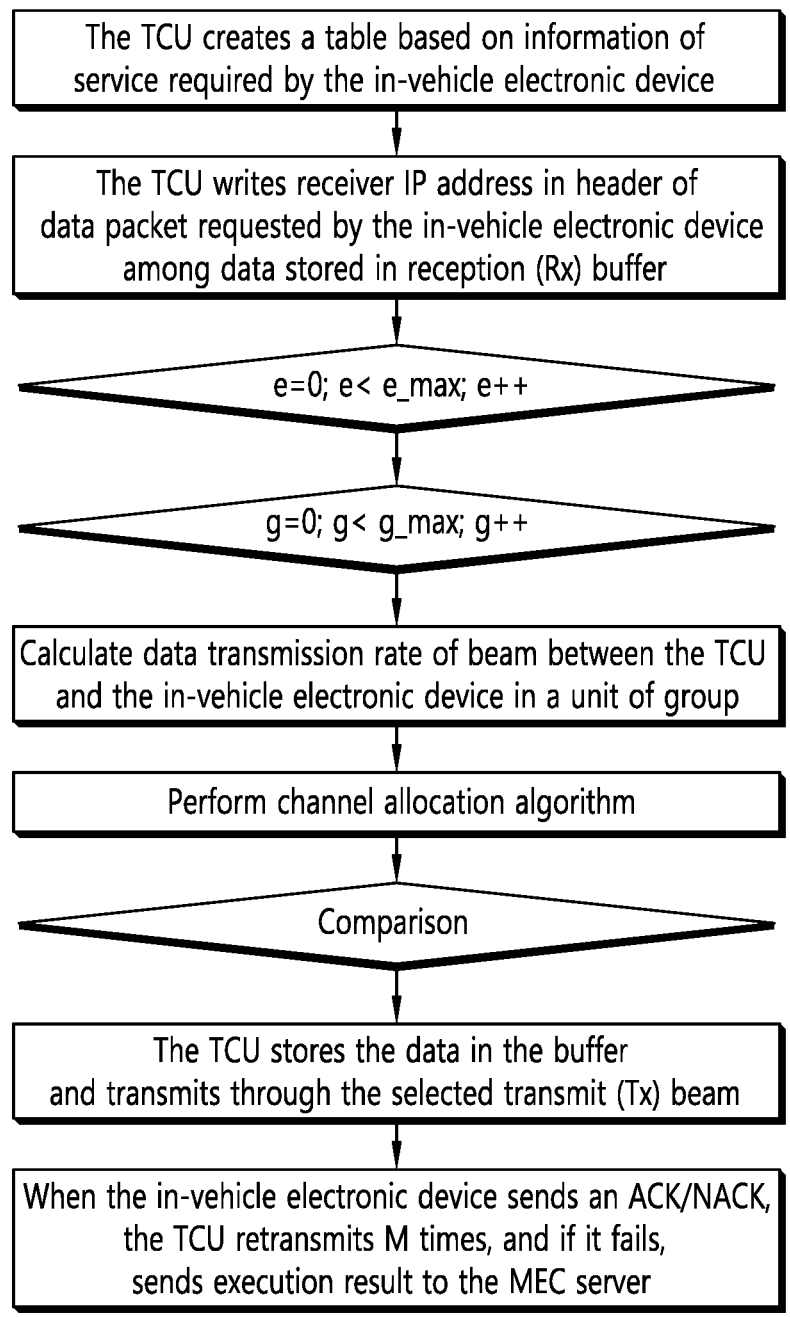
FIG. 16 is an exemplary diagram illustrating an exemplary procedure for a method disclosed in the present specification.

FIG. 16 is an exemplary diagram illustrating an exemplary procedure for a method disclosed in the present specification.

The MEC client in the TCU 100 creates a table based on information of services of each UE (information on delay requirements of AR, VR, and video, minimum data rate).

The MEC client in the TCU 100 attaches a receiver IP address to a packet header of data stored in a reception (Rx) buffer in the memory of the application processor.

Then, it is repeated using the for clause.
e=0; e<e_max; e++
g=0; g<g_max; g++
Here, the signs are as follows:
e is an index number of the in-vehicle electronic device.
g is the index number of the beam.

Next, the MEC client in the TCU 100 calculate the data rate, i.e., $R_{e,g}(t)$, of a specific beam between the TCU and the in-vehicle electronic device (e.g., e), in a unit of group as follows. Then, it is sorted in the order of the highest value.

$$R(t)=\{R_{e,1}(t), \ldots, R_{e,g}(t), \ldots, R_{e,g\_max}(t)\}$$

And the MEC client in the TCU 100 adds $R_{e,g}(t)$ to the group U(t)={ } of the selected data rate, and removes $R_{e,g}(t)$ from the existing group R(t).

Next, the MEC client in the TCU 100 performs a channel allocation algorithm as shown in FIG. 15a.

The MEC client in the TCU 100 compares and determines whether the sum of the groups of data rates is smaller than the minimum data transmission requirement of the service (h) of the in-vehicle electronic device (e).

$$\sum_{h=1}^{h=h\_all} S_{e,h}(t) < \sum_{i=0}^{i=i\_max} (t) \qquad \text{[Equation 12]}$$

h represents a service index number.

$S_{e,h}(t)$ represents the minimum data transmission requirement of the service (h) of the in-vehicle electronic device (e).

The MEC client in the TCU 100 selects a transmit (Tx) beam with $R_{e,g}(t)$. The corresponding data is stored in a buffer in the internal hardware memory inside the modem through an interface (e.g., PCI Express bus) in the transmit buffer (Tx_buffer) in the hardware memory of the application processor. And, the resource manager application inside the modem puts the data in the buffer into the $B_{e,g}(t)$ registers and wirelessly transmits it to the in-vehicle electronic device.

When the in-vehicle electronic device sends ACK/NACK, the MEC client in the TCU 100 retransmits M times, and if it fails, transmits the execution result to the MEC server 551.

Figure 17:
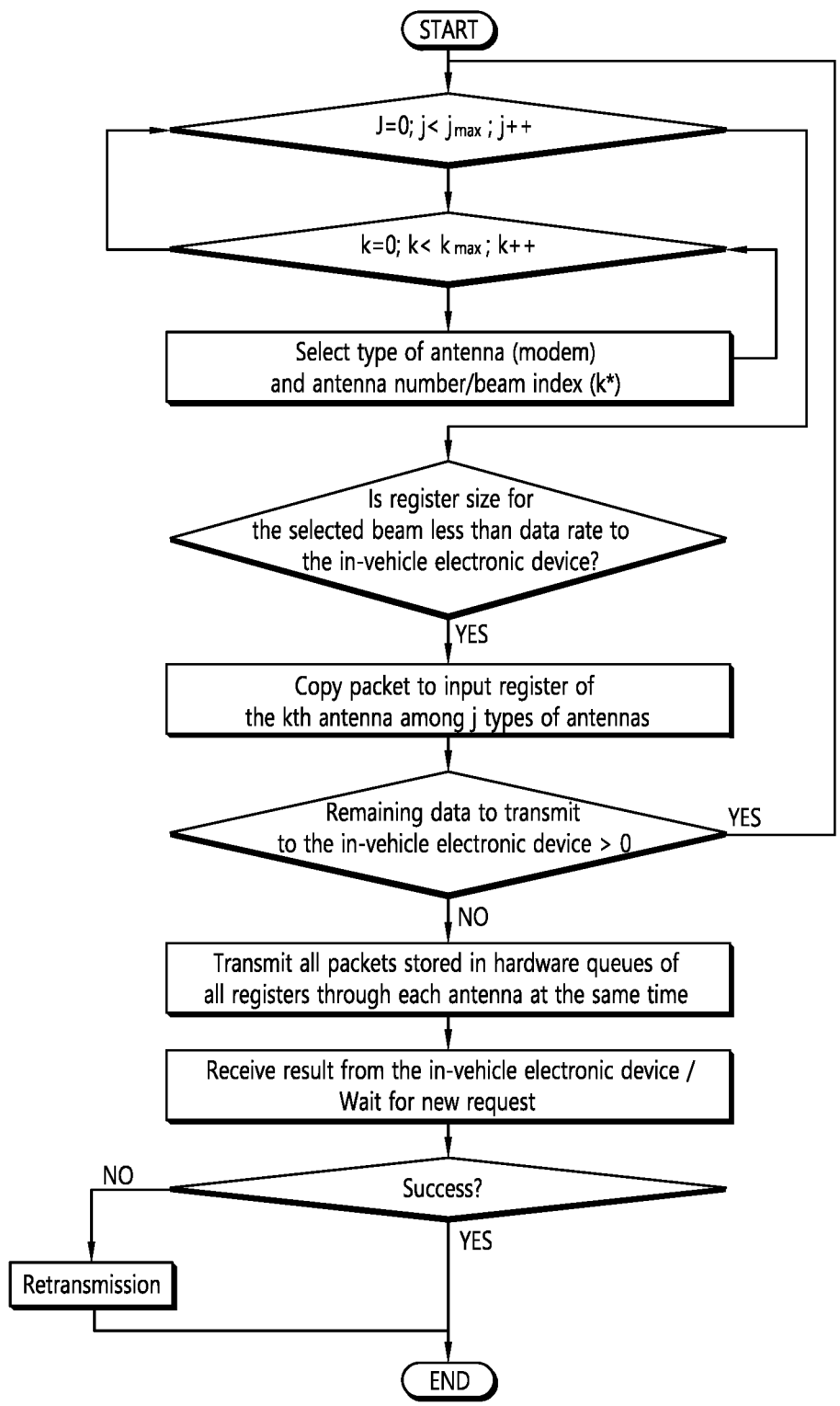
FIG. 17 is an exemplary diagram illustrating an exemplary procedure for a method disclosed in the present specification.

FIG. 17 is an exemplary diagram illustrating an exemplary procedure for a method disclosed in the present specification.

As shown in FIG. 17, the application processor of the TCU 100 operates as follows for direct communication.

First, the TCU 100 repeats the following the for clause.
j=0; j<$j_{max}$; j++
k=0; k<$k_{max}$; k++
Here, the signs are as follows:

j is an index for each type of antenna (e.g., 1=antenna for the first 5G transceiver using mmWave, 2=antenna for the second 5G transceiver using sub6 GHz, 3=antenna for LTE, 4=antenna for WLAN).

k is an antenna sequence index.

The TCU 100 selects the type of antenna (modem) and the antenna number/beam index (k*).

The selected antenna (modem) satisfies the following.

$$R_{i,j,k*}(t)=\text{Max } R(t)$$

$R_{i,j,k*}$ is the data rate.

Then, the TCU 100 removes $R_{i,j,k*}(t)$ from the group R(t) and repeats the above the for clause.

Next, it is determined whether the register size of the selected beam, i.e., $B_{i,j,k}(t)$, is smaller than the data rate, i.e., U(t), at which data downloaded from the MEC server is transmitted to the in-vehicle electronic device. Specifically, it is as follows.

$$B_{i,j,k}(t)<U(t)$$

A packet is copied to the input register of the k-th antenna of the j type antenna as much as the register size $B_{i,j,k}(t)$ for the selected beam.

And the remaining data to be transmitted to the in-vehicle electronic device is obtained as follows.

$$U(t)=U(t)-B_{i,j,k}(t)$$

Then, the TCU 100 determines whether the remaining data is greater than 0.

The TCU 100 wirelessly transmits all packets stored in hardware queues of all registers simultaneously through each antenna.

The TCU 100 waits for the reception result/new request of the in-vehicle electronic device.

If the reception result is not successful, retransmission is performed.

Figure 18:
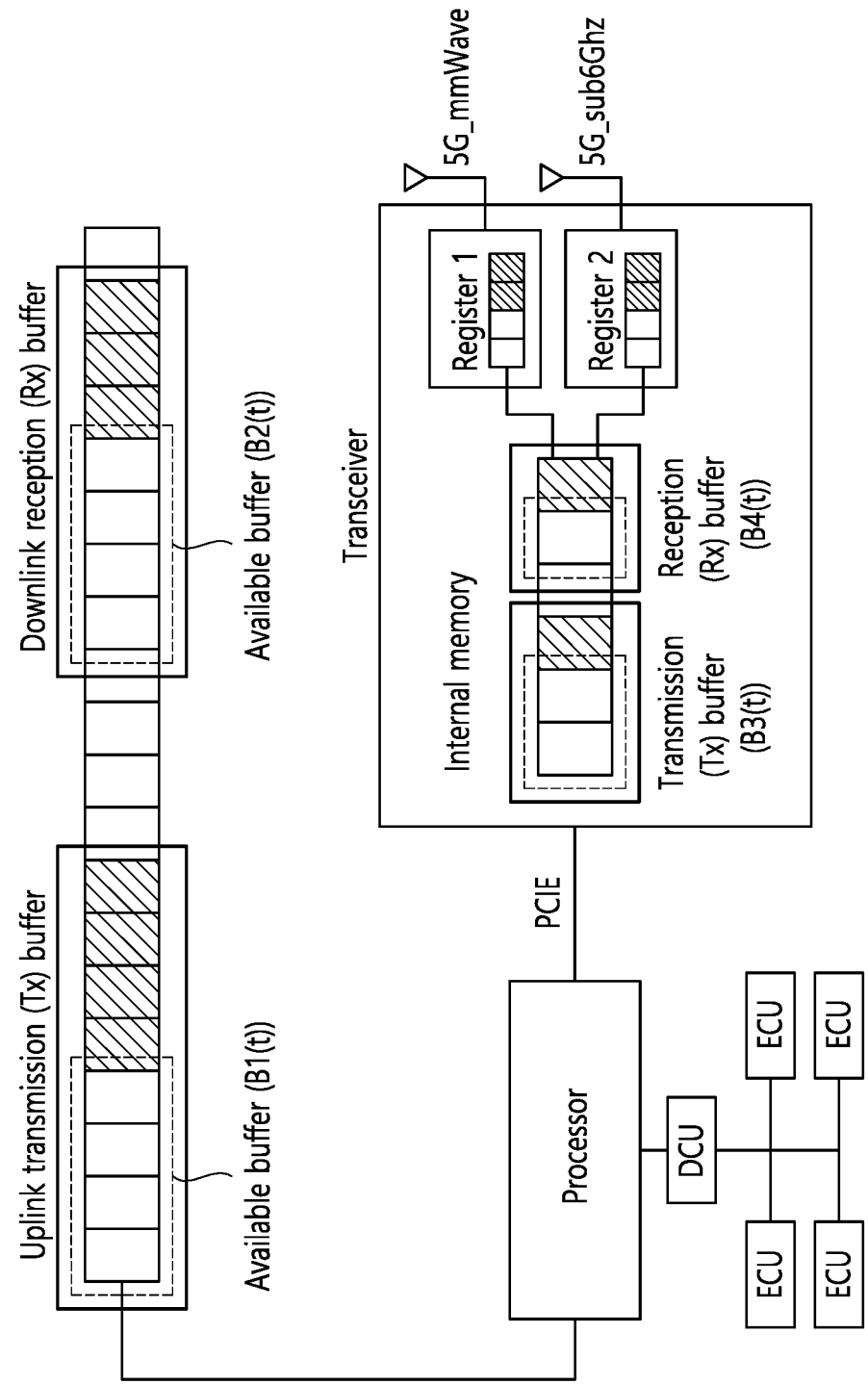
FIG. 18 shows an example of copying to a buffer according to the procedure shown in FIG. 17.

FIG. 18 shows an example of copying to a buffer according to the procedure shown in FIG. 17.

As shown in FIG. 18, a buffer for uplink transmission (Tx) and a buffer for downlink reception (Rx) may be allocated in a memory connected to the processor.

A transmission (Tx) buffer and a reception (Rx) buffer may be allocated to a memory of the transceiver (e.g., a modem).

A register of a specific size is built in the transceiver. The size of the register is referred to as $B_{i,j,k}(t)$.

$B_{i,j,k}(t)$ represents the input register size of the k-th antenna of the j type antenna (1: 5G_mmWave, 2: 5G_sub6 Ghz, 3: LTE, 4: Wi-Fi) of TCU-i.

Figure 19:
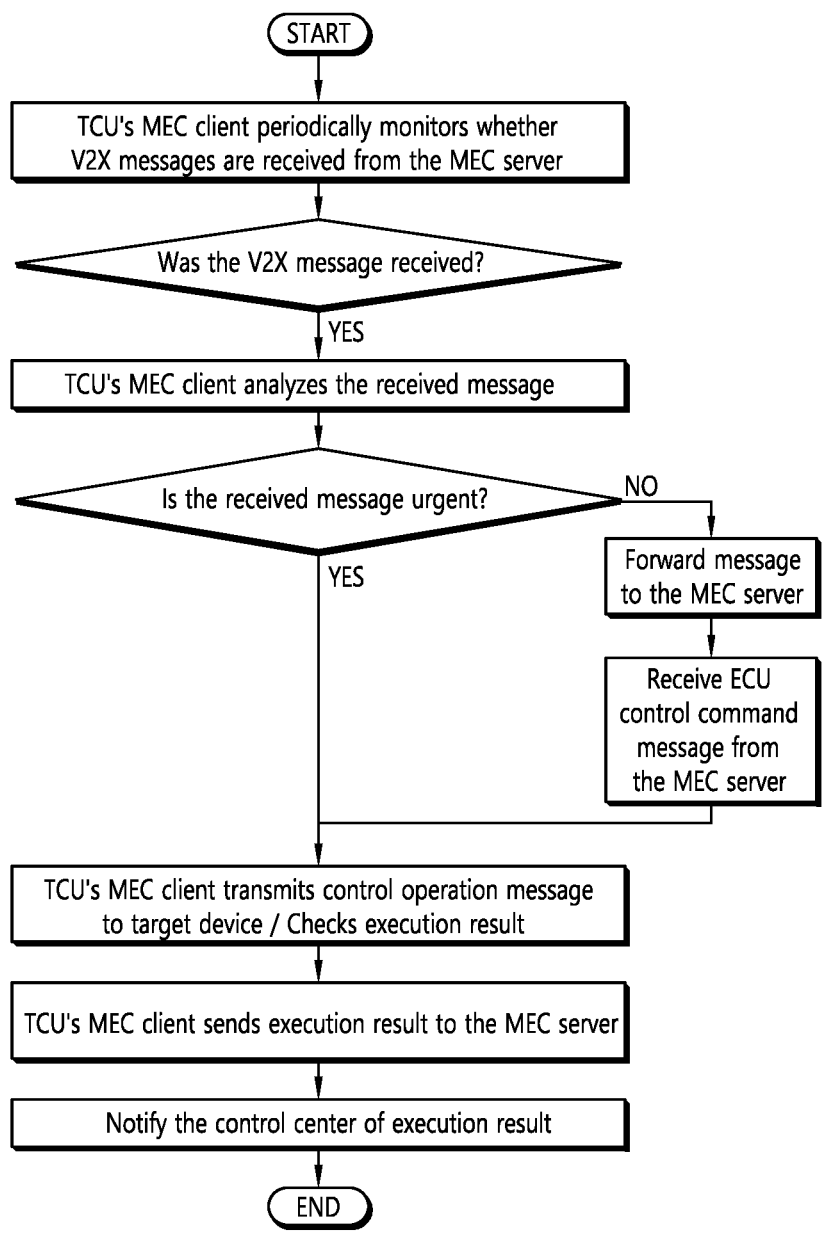
FIG. 19 is an exemplary diagram illustrating an exemplary procedure for a method disclosed in the present specification.

FIG. 19 is an exemplary diagram illustrating an exemplary procedure for a method disclosed in the present specification.

The MEC client in the TCU 100 periodically monitors whether a V2X message is received from the MEC server.

According to the monitoring, the MEC client in the TCU 100 checks whether the V2X message is received.

The MEC client in the TCU 100 checks whether the received message is an emergency message.

If the received message is not an emergency message, the MEC client in the TCU 100 transmits a message to the MEC server and receives an ECU control command message from the MEC server. Then, the MEC client in the TCU 100 transmits to the target ECU.

If the received message is an emergency message, the MEC client in the TCU 100 generates a vehicle ECU control message for a control operation and urgently transmits it to the target ECU.

When the result of the control operation is received from the target ECU, the MEC server 551 is notified. The MEC server 551 determines whether to retransmit, and the MEC server 551 leaves a record on the control operation and delivers it to the automobile manufacturer's cloud server so that the remote control center can know the status.

In the foregoing illustrative system, although the methods are explained based on flowcharts including a series of steps or blocks, the present disclosure is not limited to the order of steps, and a certain step may be performed in order or step different from that described above or may be performed concurrently with another step. Further, it may be understood by a person having ordinary skill in the art that steps shown in a flowchart are not exclusive and that another step may be incorporated or one or more steps of the flowchart may be removed without departing from the scope of the present disclosure.

Figure 20:
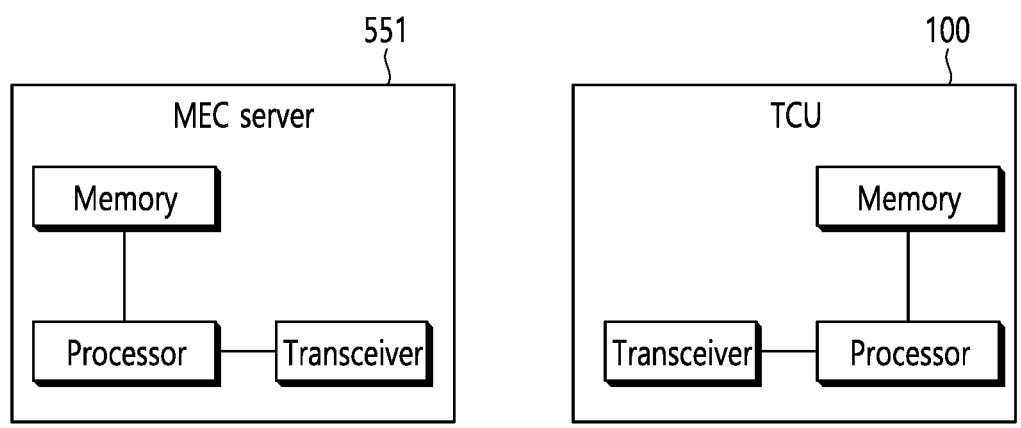
FIG. 20 is a block diagram illustrating the implementation of an MEC server and a TCU according to an embodiment.

FIG. 20 is a block diagram illustrating the implementation of an MEC server and a TCU according to an embodiment.

Referring to FIG. 20, each of the MEC server 551 and the TCU 100 may include a memory, a processor, and a transceiver.

The illustrated processor, memory, and transceiver may be implemented as separate chips, or at least two blocks/functions may be implemented through one chip.

The transceiver includes a transmitter and a receiver. When a specific operation is performed, only one of the operations of the transmitter and the receiver may be performed, or both of the operations of the transmitter and the receiver may be performed. The transceiver may include at least one antenna for transmitting and/or receiving a radio signal. In addition, the transceiver may include an amplifier for amplifying a reception signal and/or a transmission signal and a band-pass filter for transmission in a specific frequency band.

As described above, the transceiver of the TCU may include a first 5G transceiver (i.e., a modem/antenna using sub-6 GHz), a second 5G transceiver (i.e., a modem/antenna using mmWave), and an LTE transceiver (i.e., an LTE modem/antenna using LTE).

The processor may implement the functions, procedures, and/or methods proposed in the present disclosure. The processor may include an encoder and a decoder. For example, the processor may perform an operation according to the above description. The processor may include an Application-Specific Integrated Circuit (ASIC), a different chipset, a logic circuit, a data processing device, and/or a converter to convert a baseband signal and a radio signal into each other.

The memory may include a Read-Only Memory (ROM), a Random-Access Memory (RAM), a flash memory, a memory card, a storage medium, and/or other storage devices.

Figure 21:
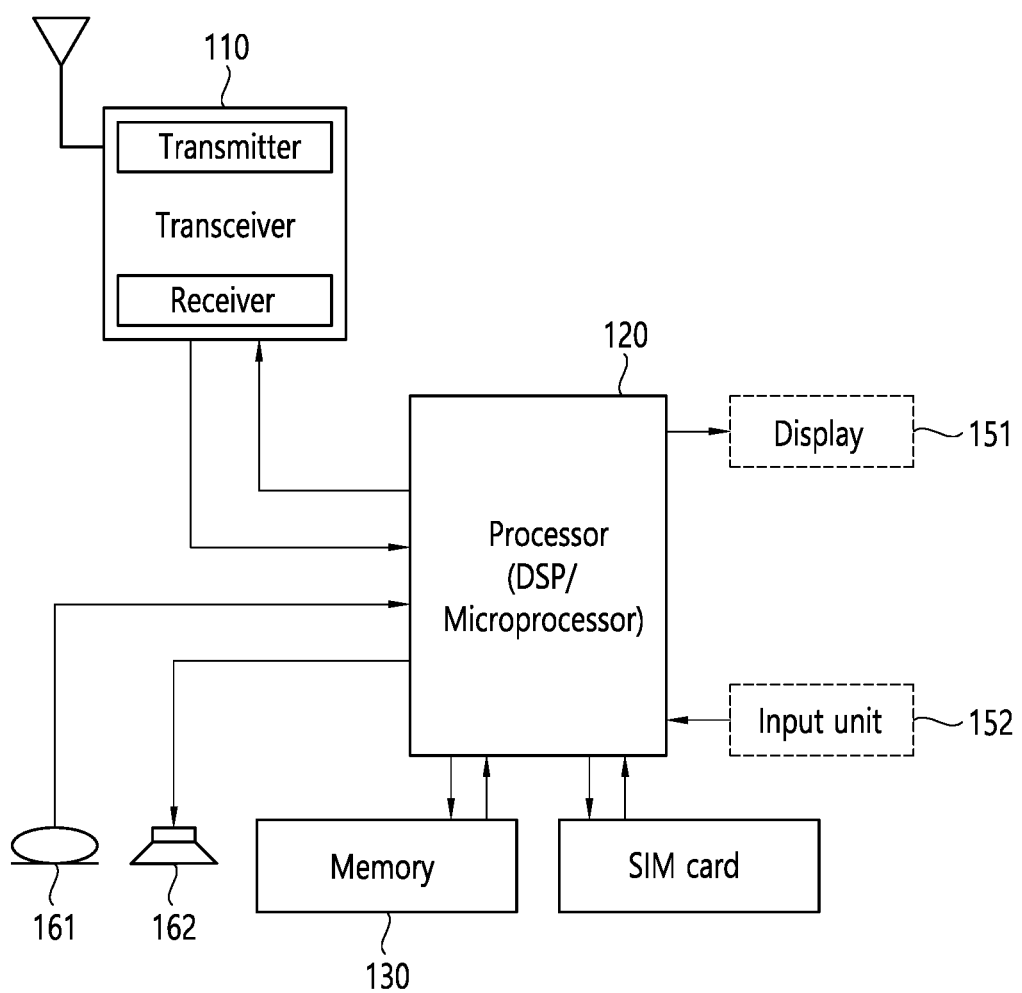
FIG. 21 is a block diagram illustrating an implementation of a TCU in detail according to an embodiment of the present disclosure.

FIG. 21 is a block diagram illustrating an implementation of a TCU in detail according to an embodiment of the present disclosure.

The illustrated TCU 100 includes a transceiver 110, a processor 120, a memory 130, at least one more antenna, and a Subscriber Identification Module (SIM) card.

The illustrated TCU 100 may further include a speaker 161 and a microphone 162 as necessary.

The illustrated TCU 100 may further include a display 151 and an input unit 152 as necessary.

The processor 120 may be configured to implement the proposed functions, procedures and/or methods described in the present disclosure. Layers of a radio interface protocol may be implemented in the processor 120. The processor 120 may include an Application-Specific Integrated Circuit (ASIC), a different chipset, a logic circuit, and/or a data processing device. The processor 120 may be an Application Processor (AP). The processor 120 may include at least one of a Digital Signal Processor (DSP), a Central Processing Unit (CPU), a Graphics Processing Unit (GPU), and a modem (modulator and demodulator). Examples of the processor 120 may include SNAPDRAGON™ series processors made by Qualcomm®, EXYNOS™ series processors made by Samsung®, A series processors made by Apple®, HELIO™ series processors made by MediaTek®, ATOM™ series processors made by Intel®, or a corresponding next-generation processor.

The display 151 outputs the result of processing by the processor 120. The input unit 152 receives an input to be used by the processor 120. The input unit 152 may be displayed on the display 151. The SIM card is an integrated circuit used to securely store an International Mobile Subscriber Identity (IMSI) and an associated key used to identify and authenticate a subscriber in a mobile phone device, such as a mobile phone and a computer. The SIM card may be implemented as a computer program and stored in the memory rather than being physically implemented.

The memory 130 is operatively connected to the processor 120 and stores various pieces of information for operating the processor 120. The memory 130 may include a Read-Only Memory (ROM), a Random-Access Memory (RAM), a flash memory, a memory card, a storage medium, and/or other storage devices. When the embodiments are implemented in software, the techniques described herein may be implemented as modules (e.g., procedures and functions) that perform the functions described herein. The modules may be stored in the memory 130 and executed by the processor 120. The memory 130 may be implemented inside the processor 120. Alternatively, the memory 130 may be implemented outside the processor 120 and may be communicatively connected to the processor 120 through various methods known in the art.

The transceiver 110 is operatively connected to the processor 120 and transmits and/or receives a radio signal. The transceiver 110 includes a transmitter and a receiver. The transceiver 110 may include a baseband circuit to process a radio-frequency signal. The transceiver controls at least one antenna to transmit and/or receive a radio signal.

The speaker 161 outputs a sound related result of processing by the processor 120. The microphone 162 receives a sound-related input to be used by the processor 120.

In the above, preferred embodiments of the present disclosure have been exemplarily described, but the disclosure of the present specification is not limited to such specific embodiments, and thus, it may be modified, changed, or improved in various forms within the scope set forth in the claims.

What is claimed is:

1. A Telematics Communication Unit (TCU) mounted in a vehicle, the TCU comprising:
   a memory;
   a plurality of transceivers including one or more antennas; and
   a processor for controlling the plurality of transceivers, wherein the processor is configured to perform operations comprising:
   after collecting service requirements for one or more electronic devices in the vehicle, transmitting the service requirements to a server through a base station;
   receiving downlink data from the server through the base station;
   determining whether a data transmission rate according to the service requirements for the one or more electronic devices in the vehicle can be supported as a transmission rate through available frequency channels of an antenna beam; and
   transmitting the downlink data received from the server through a corresponding antenna beam to the one or more electronic devices in the vehicle according to the determination.

2. The TCU of claim 1, wherein collecting the service requirements for the one or more electronic devices in the vehicle comprises:
   obtaining information on service requirements for each electronic device; and
   collecting the information on the service requirements, and
   wherein the information on the service requirements includes information on a minimum data transmission rate and delay requirements.

3. The TCU of claim 1, wherein the processor is further configured to perform operations comprising:
   selecting a transceiver and an antenna beam having a maximum transmission rate from among the plurality of transceivers.

4. The TCU of claim 1, wherein the processor is further configured to perform operations comprising:
   buffering the downlink data received from the server in a reception buffer in the memory.

5. The TCU of claim 4, wherein the processor is further configured to perform operations comprising:
   copying the downlink data buffered in the buffer to internal registers by a size of each of the internal registers of each of the plurality of transceivers.

6. The TCU of claim 1, wherein the plurality of transceivers comprises a Long-Term Evolution (LTE) transceiver, a 5G transceiver, and a Wireless Local Area Network (WLAN) transceiver.

7. The TCU of claim 6, wherein the 5G transceiver comprises a first 5G transceiver using a sub-6 GHz band and a second 5G transceiver using mmWave.

8. The TCU of claim 1, wherein the one or more electronic devices in the vehicle comprises at least one of an Engine Control Unit (ECU), a Domain Control Unit (DCU), a Local Interconnect Network (LIN) master, a Media Oriented System Transport (MOST) master, an Ethernet switch, a radar sensor, a LiDAR sensor, a camera, an Audio Video Navigation (AVN), and a Rear Seat Entertainment (RSE).

9. A server for controlling a Telematics Communication Unit (TCU) mounted in a vehicle in a next-generation mobile communication system, the server comprising:
   a transceiver; and
   a processor for controlling the transceiver, wherein the processor is configured to perform operations comprising:
   receiving, through a base station, information on service requirements for one or more electronic devices connected to the TCU mounted in the vehicle;
   comparing a data transmission rate by an antenna beam of the base station and a data transmission rate according to the service requirements; and
   transmitting downlink data through the antenna beam of the base station.

10. The server of claim 9, wherein the processor is further configured to perform operations comprising:
    determining a radio channel to be used between the TCU mounted in the vehicle and the one or more electronic devices; and
    transmitting information on the determined radio channel to the TCU through the base station.

11. The server of claim 10, wherein determining the radio channel comprises:
    calculating a distance to other TCUs;
    comparing the distance to the other TCUs with a threshold distance; and
    according to the comparison, determining a radio channel having a signal strength greater than a Signal-to-Interference and Noise Ratio (SINK) causing a transmission failure.

12. The sever of claim 11, wherein determining the radio channel comprises:
    selecting a plurality of radio channels.

13. The server of claim 9, wherein the processor is further configured to perform operations comprising:
    determining an antenna beam between the TCU mounted in the vehicle and the one or more electronic devices; and
    transmitting information on the determined antenna beam to the TCU through the base station.

14. The server of claim 9, wherein the base station comprises a Long-Term Evolution (LTE) transceiver, a 5G transceiver, and a Wireless Local Area Network (WLAN) transceiver.

15. The server of claim 14, wherein the 5G transceiver comprises a first 5G transceiver using a sub-6 GHz band and a second 5G transceiver using mmWave.

* * * * *